(12) United States Patent
Lee et al.

(10) Patent No.: US 12,185,342 B2
(45) Date of Patent: Dec. 31, 2024

(54) METHOD AND APPARATUS FOR TRANSMITTING PSFCH IN NR V2X

(71) Applicant: LG ELECTRONICS INC., Seoul (KR)

(72) Inventors: Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 17/755,646

(22) PCT Filed: Nov. 9, 2020

(86) PCT No.: PCT/KR2020/015617
§ 371 (c)(1),
(2) Date: May 4, 2022

(87) PCT Pub. No.: WO2021/091340
PCT Pub. Date: May 14, 2021

(65) Prior Publication Data
US 2022/0394702 A1 Dec. 8, 2022

Related U.S. Application Data

(60) Provisional application No. 62/933,331, filed on Nov. 8, 2019, provisional application No. 62/932,491, filed on Nov. 7, 2019.

(51) Int. Cl.
*H04W 72/04* (2023.01)
*H04L 1/1812* (2023.01)
(Continued)

(52) U.S. Cl.
CPC .......... *H04W 72/51* (2023.01); *H04L 1/1812* (2013.01); *H04L 5/0053* (2013.01); *H04W 72/02* (2013.01); *H04W 72/20* (2023.01)

(58) Field of Classification Search
CPC ..... H04W 72/51; H04W 72/02; H04W 72/20; H04W 4/40; H04W 92/18; H04L 1/1812;
(Continued)

(56) References Cited

U.S. PATENT DOCUMENTS

2016/0073408 A1* 3/2016 Sartori .............. H04W 72/0453
370/329
2019/0254091 A1* 8/2019 Kim ...................... H04L 5/0078
(Continued)

OTHER PUBLICATIONS

PCT International Application No. PCT/KR2020/015617, International Search Report dated Feb. 15, 2021, 3 pages.
(Continued)

*Primary Examiner* — Jay P Patel
(74) *Attorney, Agent, or Firm* — LEE, HONG, DEGERMAN, KANG & WAIMEY

(57) ABSTRACT

According to an embodiment of the present disclosure, a method for performing sidelink communication is provided. The method may include: receiving sidelink control information (SCI) from a second apparatus and transmitting hybrid automatic repeat request negative acknowledgement (HARQ NACK) to the second apparatus through physical sidelink feedback channel (PSFCH) based on information on a location of the first apparatus being not available and HARQ NACK-only feedback option being applied by the SCI, wherein a transport block (TB) related to the SCI is not decoded by the first apparatus.

20 Claims, 35 Drawing Sheets

(51) Int. Cl.
*H04L 5/00* (2006.01)
*H04W 72/02* (2009.01)
*H04W 72/20* (2023.01)
*H04W 72/51* (2023.01)

(58) Field of Classification Search
CPC ... H04L 5/0053; H04L 5/0012; H04L 5/0026; H04L 5/0033; H04L 5/0055; H04L 5/0069; H04L 5/0091; H04L 27/2601; H04L 1/1614
See application file for complete search history.

(56) References Cited

U.S. PATENT DOCUMENTS

| | | | |
|---|---|---|---|
| 2020/0067650 A1* | 2/2020 | Kim | H04W 4/40 |
| 2020/0100048 A1* | 3/2020 | Wu | H04W 4/02 |
| 2021/0037468 A1* | 2/2021 | Huang | H04W 76/23 |
| 2021/0219268 A1* | 7/2021 | Li | H04B 17/318 |
| 2022/0085923 A1* | 3/2022 | Ye | H04L 1/1864 |
| 2022/0166556 A1* | 5/2022 | Lee | H04W 4/40 |
| 2022/0201423 A1* | 6/2022 | Freda | H04W 72/02 |
| 2022/0201654 A1* | 6/2022 | Lee | H04W 72/20 |
| 2022/0247539 A1* | 8/2022 | Luo | H04L 1/1854 |
| 2022/0303952 A1* | 9/2022 | Hoang | H04L 5/0005 |
| 2022/0330038 A1* | 10/2022 | Ganesan | H04B 7/0404 |

OTHER PUBLICATIONS

Samsung, "On Physical Layer Procedures for NR V2X," R1-1901048, 3GPP TSG RAN WG1 Ad-Hoc Meeting 1901, Jan. 2019, 13 pages.

LG Electronics, "Discussion on physical layer procedure for NR V2X," R1-1900648, 3GPP TSG RAN WG1 Meeting AH 1901, Jan. 2019, 12 pages.

LG Electronics, "Feature lead summary for agenda item 7.2.4.1.2 Physical layer procedures," R1-1901323, 3GPP TSG RAN WG1 Ad-Hoc Meeting 1901, Jan. 2019, 19 pages.

* cited by examiner

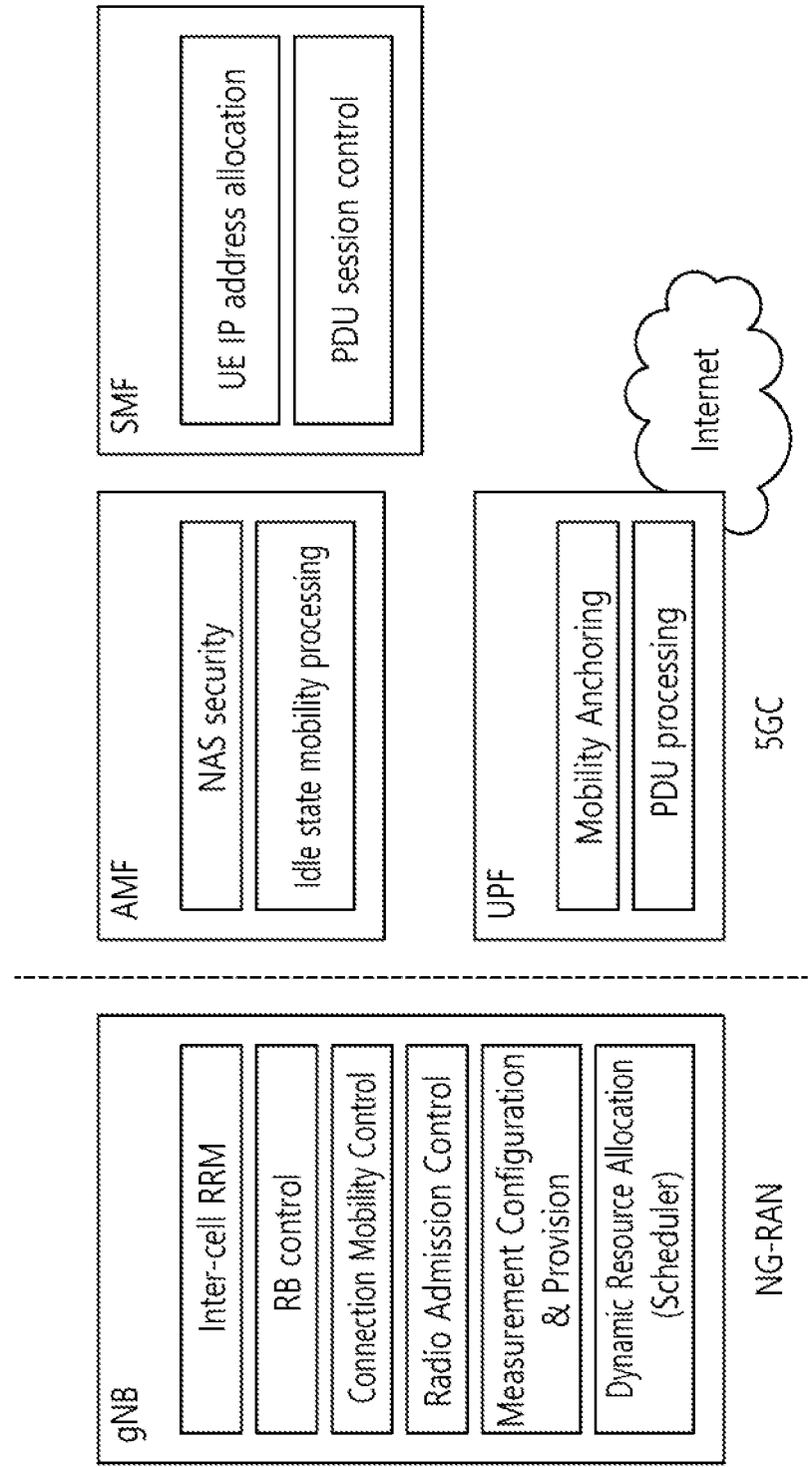

METHOD AND APPARATUS FOR TRANSMITTING PSFCH IN NR V2X

CROSS-REFERENCE TO RELATED APPLICATIONS

This application is the National Stage filing under 35 U.S.C. 371 of International Application No. PCT/KR2020/015617, filed on Nov. 9, 2020, which claims the benefit of U.S. Provisional Application No. 62/932,491, filed on Nov. 7, 2019, and 62/933,331, filed on Nov. 8, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between user equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and the like. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing radio access technology (RAT) is rising. Accordingly, discussions are made on services and user equipment (UE) that are sensitive to reliability and latency. A next-generation radio access technology that is based on the enhanced mobile broadband communication, massive machine-type communication (MTC), ultra-reliable and low latency communication (URLLC), and the like, may be referred to as a new radio access technology (RAT) or new radio (NR). Here, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message, such as a basic safety message (BSM), a cooperative awareness message (CAM), and a decentralized environmental notification message (DENM), is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

Technical Objects

The technical problem of the present disclosure is to provide a side link communication method between devices (or terminals) and a device (or terminal) performing the same.

Technical Solutions

According to an embodiment of the present disclosure, a method for performing sidelink communication by a first apparatus is provided. The method includes: receiving sidelink control information (SCI) from a second apparatus, and transmitting hybrid automatic repeat request negative acknowledgement (HARQ NACK) to the second apparatus through physical sidelink feedback channel (PSFCH) based on information on a location of the first apparatus being not available and HARQ NACK-only feedback option being applied by the SCI, wherein a transport block (TB) related to the SCI is not decoded by the first apparatus.

According to an embodiment of the present disclosure, a first apparatus for performing sidelink communication is provided. The first apparatus may include at least one memory to store instructions, at least one transceiver, and at least one processor to connect the at least one memory and the at least one transceiver, wherein the at least one processor may be configured to: control the at least one transceiver to receive SCI from a second apparatus, and control the at least one transceiver to transmit HARQ NACK to the second apparatus through PSFCH based on information on a location of the first apparatus being not available and HARQ NACK-only feedback option being applied by the SCI, wherein a TB related to the SCI is not decoded by the first apparatus.

According to an embodiment of the present disclosure, an apparatus (or chip) configured to control a first terminal is provided. The apparatus may include at least one processor and at least one computer memory that is connected to be executable by the at least one processor and stores instructions, wherein the at least one processor executes the instructions to cause the first terminal to: receive SCI from a second terminal, and transmit HARQ NACK to the second terminal through PSFCH based on information on a location of the first terminal being not available and HARQ NACK-only feedback option being applied by the SCI, wherein a TB related to the SCI is not decoded by the first terminal.

According to an embodiment of the present disclosure, a non-transitory computer-readable storage medium that stores instructions (or indications) is provided. When the instructions are executed, the instructions cause a first apparatus to: receive SCI from a second apparatus, and transmit HARQ NACK to the second apparatus through PSFCH based on information on a location of the first apparatus being not available and HARQ NACK-only feedback option being applied by the SCI, wherein a TB related to the SCI is not decoded by the first apparatus.

According to an embodiment of the present disclosure, a method for performing sidelink communication by a second apparatus is provided. The method includes: transmitting SCI to a first apparatus; and receiving HARQ NACK from the first apparatus through PSFCH based on information on a location of the first apparatus being not available in the first apparatus and HARQ NACK-only feedback option being applied to the first apparatus by the SCI, wherein a TB related to the SCI is not decoded by the first apparatus.

According to an embodiment of the present disclosure, a second apparatus for performing sidelink communication is provided. The second apparatus may include at least one memory storing instructions, at least one transceiver and at least one processor connected to the at least one memory and the at least one transceiver, wherein the at least one processor is configured to: control the at least one transceiver to transmit SCI to a first apparatus, and control the at least one transceiver to receive HARQ NACK from the first apparatus through PSFCH based on information on a location of the first apparatus being not available in the first apparatus and HARQ NACK-only feedback option being applied to the first apparatus by the SCI, wherein a TB related to the SCI is not decoded by the first apparatus.

Effects of the Disclosure

According to the present disclosure, a UE (or apparatus) may efficiently perform SL communication.

According to the present disclosure, regardless of the validity of location information of (RX) UE, service requirements may be satisfied.

BRIEF DESCRIPTION OF THE DRAWINGS

FIG. 3 shows a functional division between an NG-RAN and a 5GC in accordance with an embodiment of the present disclosure.

FIG. 21 shows an example of PSFCH resource determination based on formula.

FIG. 22 shows other example of PSFCH resource determination based on formula.

DESCRIPTION OF EXEMPLARY EMBODIMENTS

Figure 1:
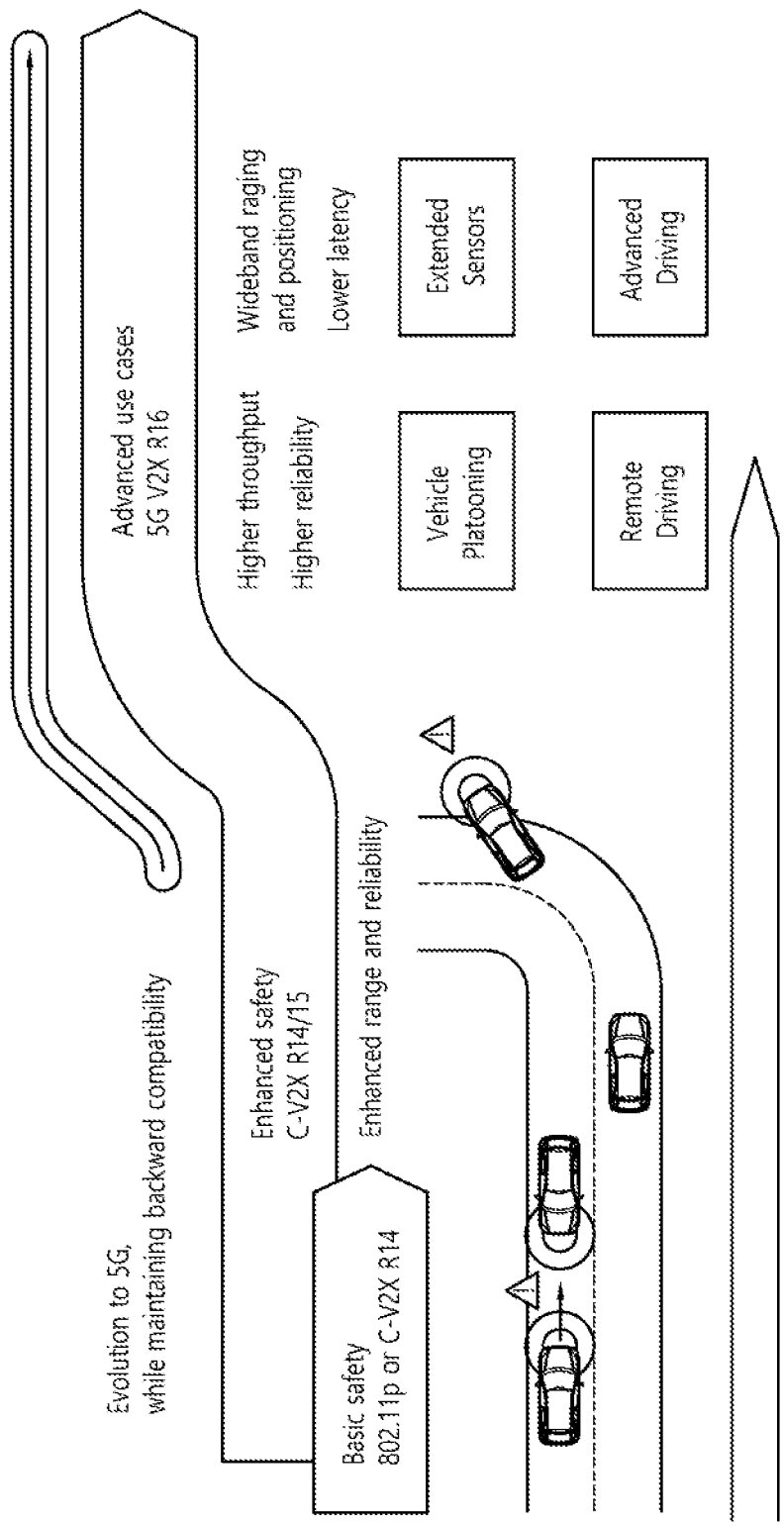
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCT" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and the like. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and the like. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and the like. 5G NR may use resources of all spectrum available for usage including low frequency bands of less than 1 GHz, middle frequency bands ranging from 1 GHz to 10 GHz, high frequency (millimeter waves) of 24 GHz or more, and the like.

For clarity in the description, the following description will mostly focus on LTE-A or 5G NR. However, technical features according to an embodiment of the present disclosure will not be limited only to this.

Figure 2:
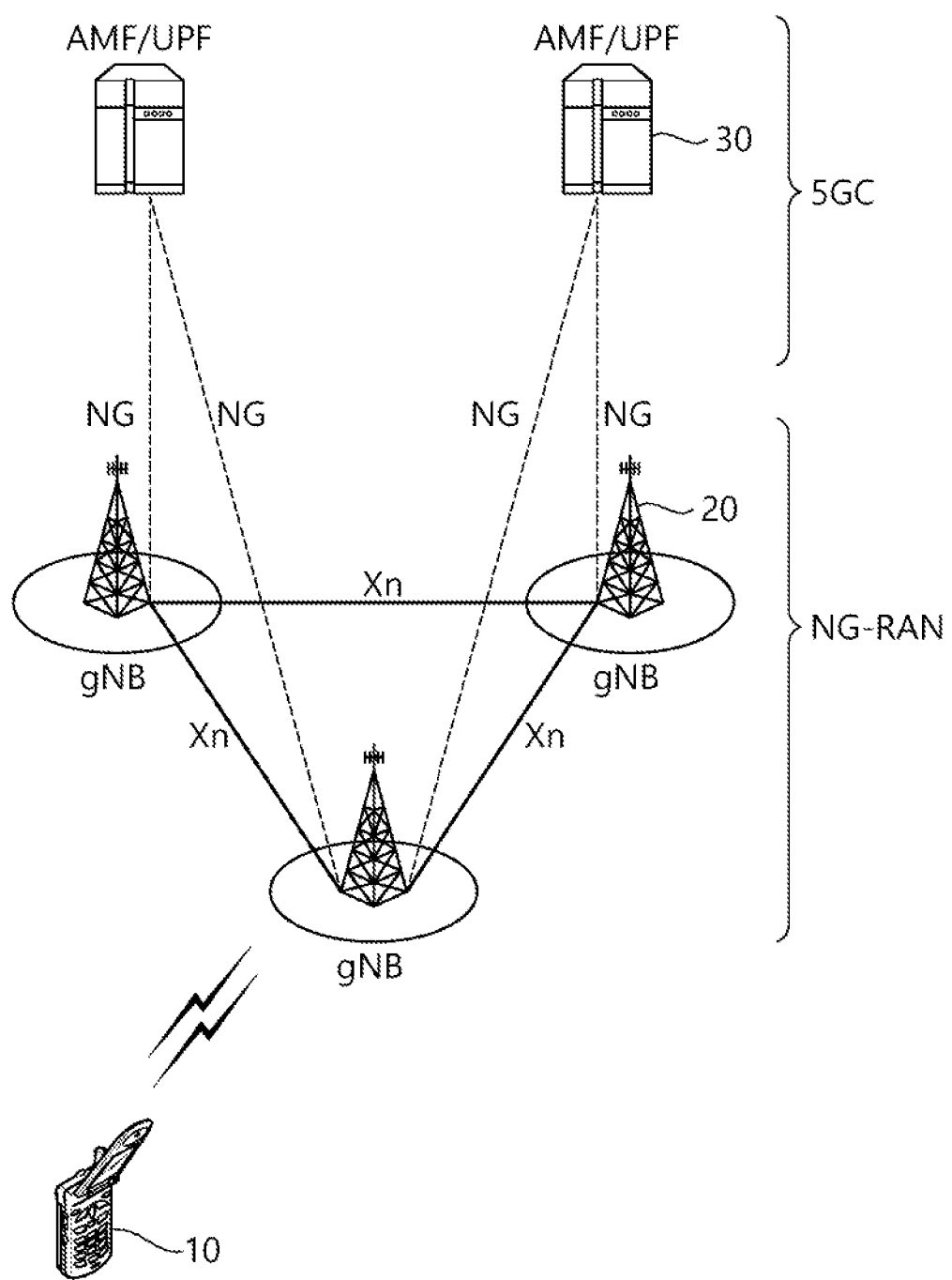
FIG. 2 shows a structure of an NR system in accordance with an embodiment of the present disclosure.

FIG. 2 shows a structure of an NR system in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), a wireless device, and the like. For example, the BS may be referred to as a fixed station which communicates with the UE 10 and may be referred to as other terms, such as a base transceiver system (BTS), an access point (AP), and the like.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

FIG. 3 shows a functional division between an NG-RAN and a 5GC in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and the like. An AMF may provide functions, such as non access stratum (NAS) security, idle state mobility processing, and the like. A UPF may provide functions, such as mobility anchoring, protocol data unit (PDU) processing, and the like. A session management function (SMF) may provide functions, such as user equipment (UE) Internet protocol (IP) address allocation, PDU session control, and the like.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
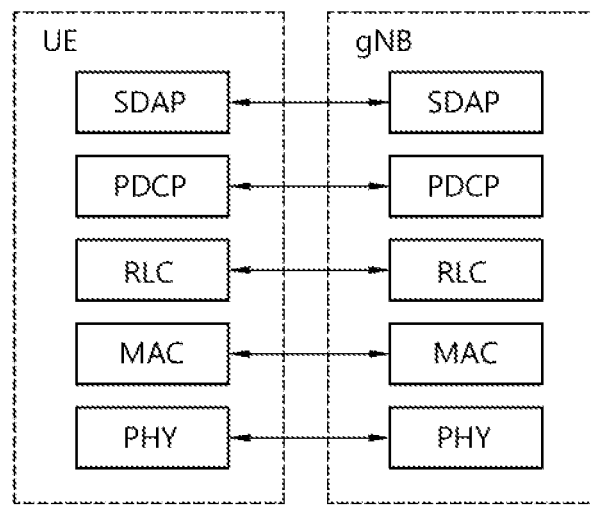
FIG. 4A and FIG. 4B show a radio protocol architecture in accordance with an embodiment of the present disclosure.
Figure 4B:
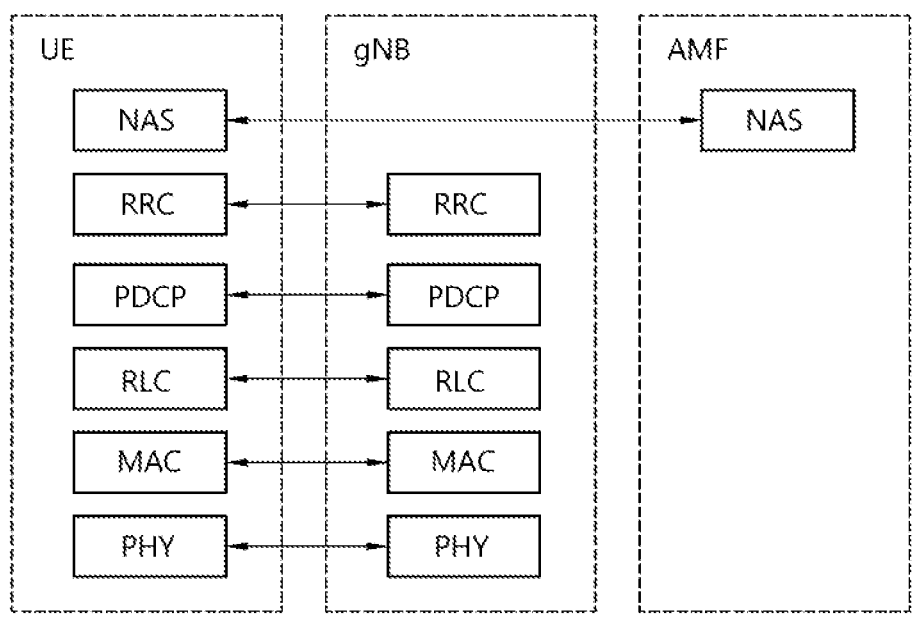

FIG. 4A and FIG. 4B show a radio protocol architecture in accordance with an embodiment of the present disclosure.

The embodiments of FIG. 4A and FIG. 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIG. 4A and FIG. 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), or the like The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
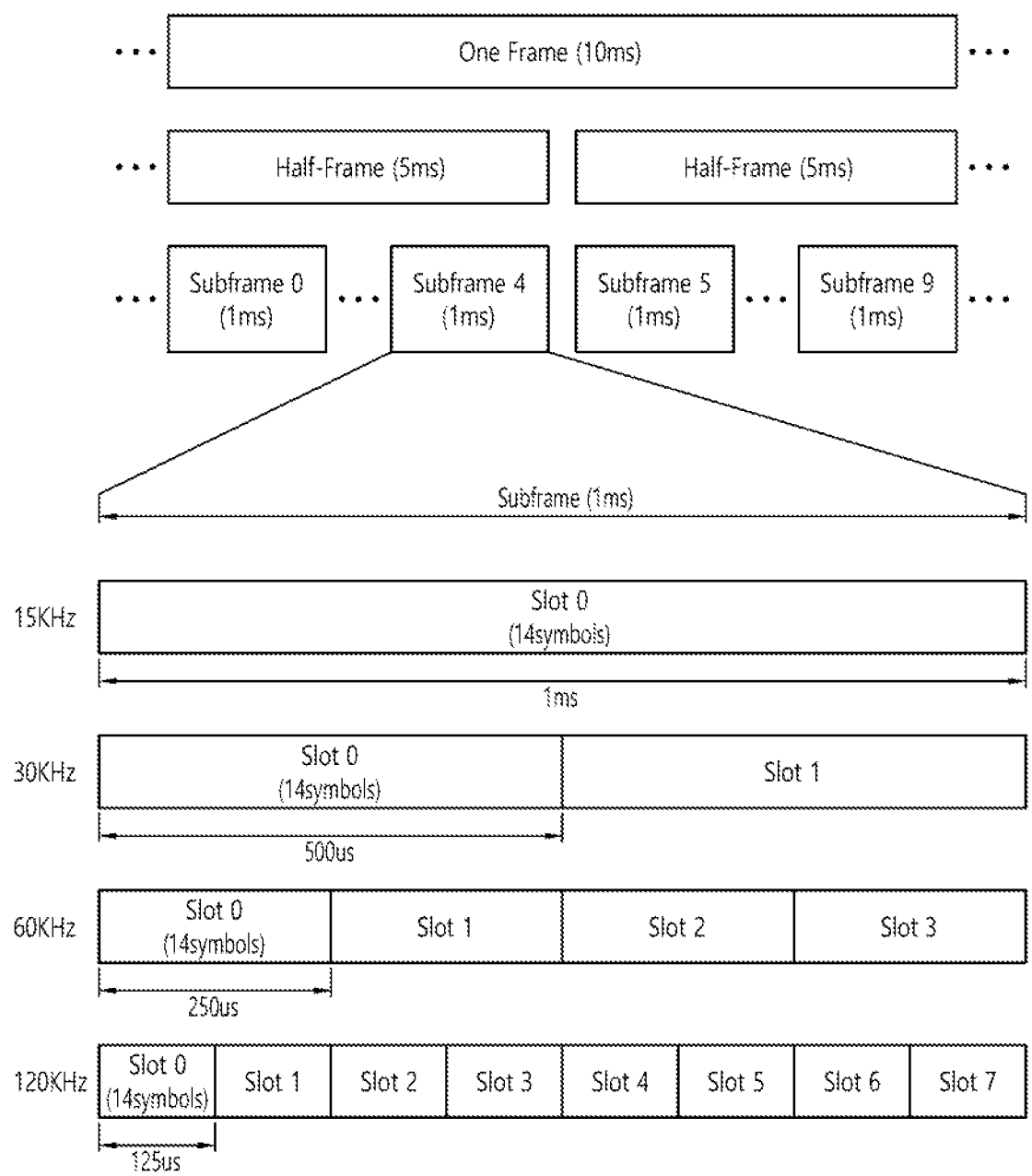
FIG. 5 shows a structure of an NR system in accordance with an embodiment of the present disclosure.

FIG. 5 shows a structure of an NR system in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Here, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and the like) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and the like) and higher. For example, a frequency band of 6 GHz (or 5850, 5900, 5925 MHz, and the like) and higher may be included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
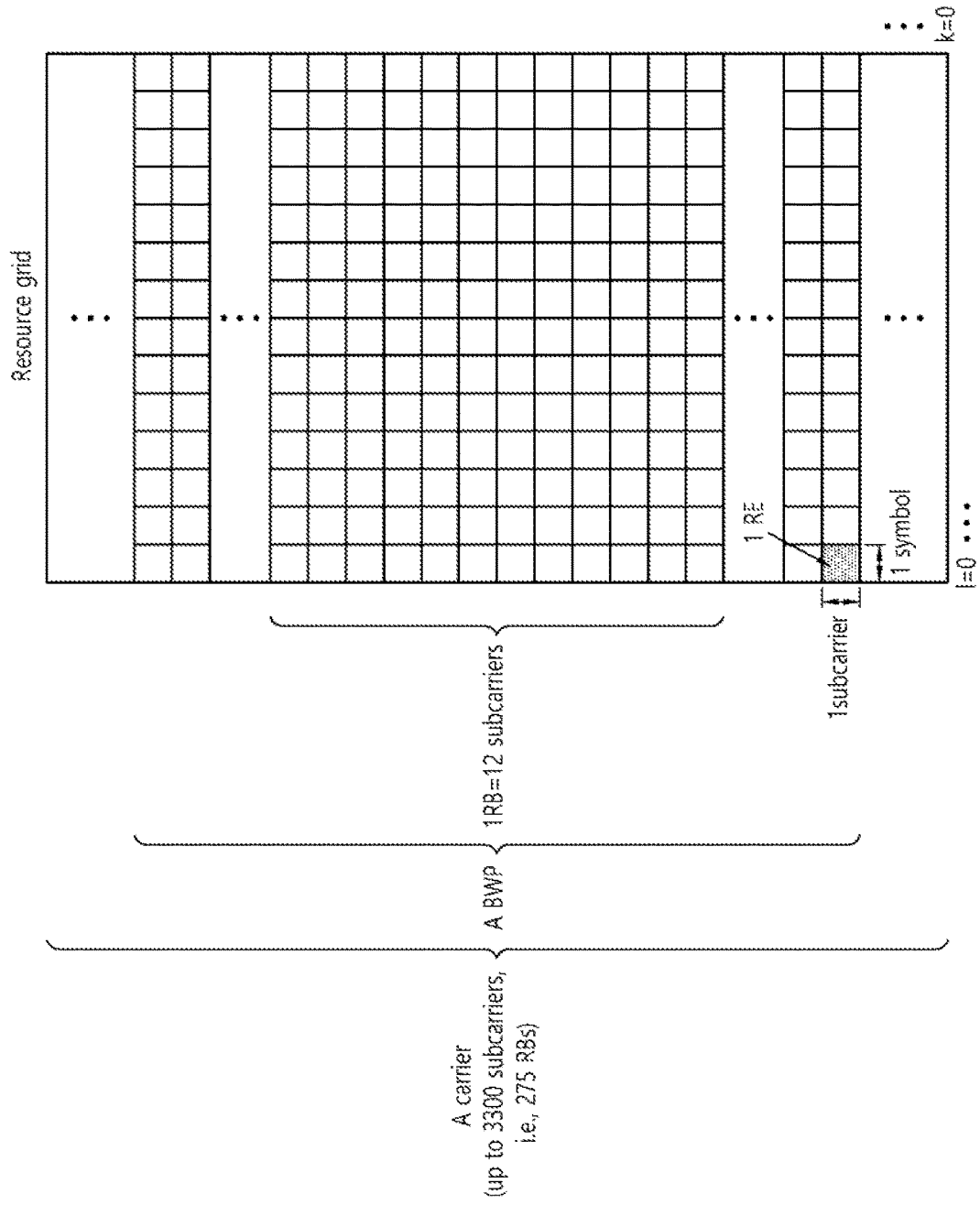
FIG. 6 shows a structure of a slot of an NR frame in accordance with an embodiment of the present disclosure.

FIG. 6 shows a structure of a slot of an NR frame in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and the like). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
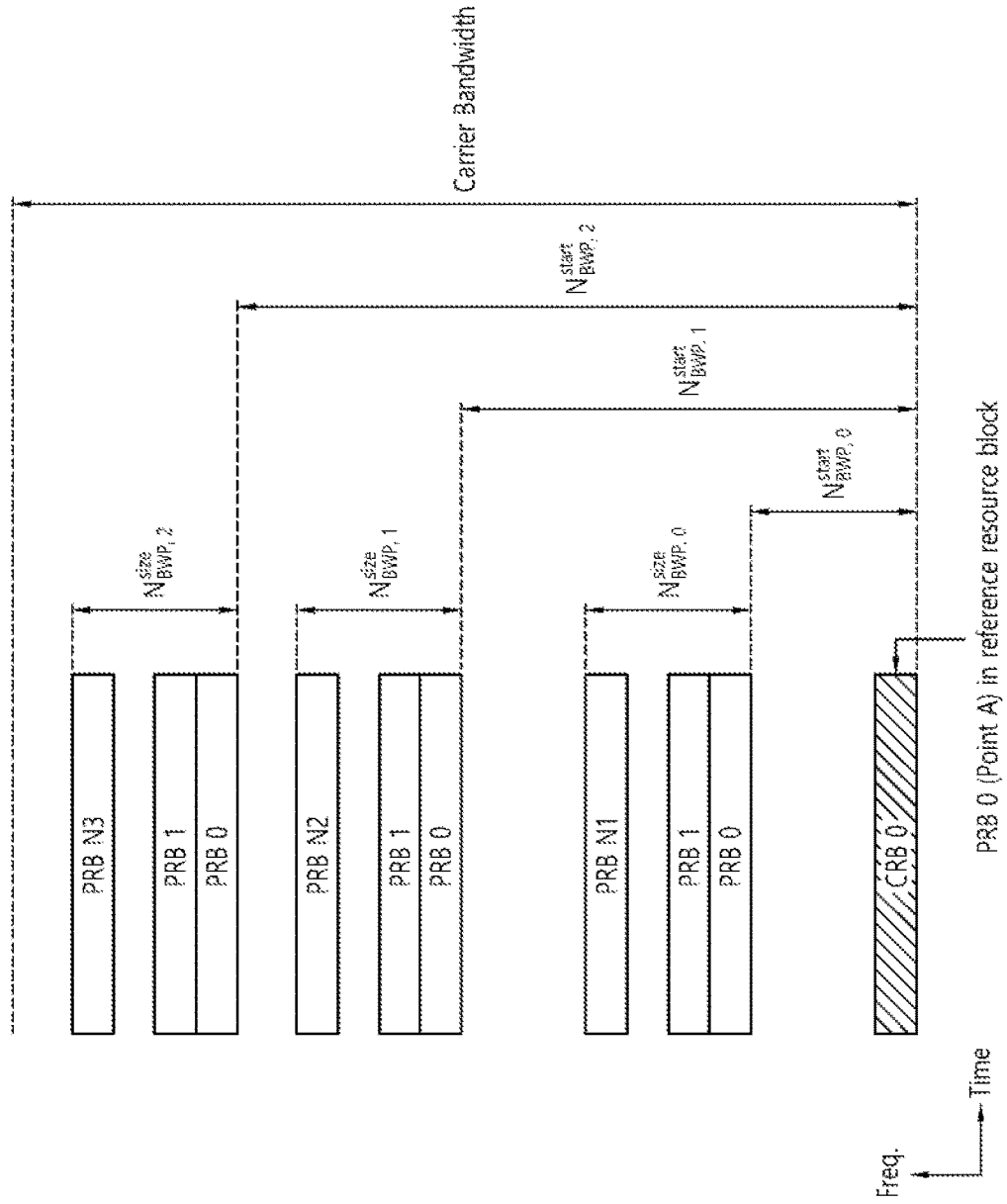
FIG. 7 shows an example of a BWP in accordance with an embodiment of the present disclosure.

FIG. 7 shows an example of a BWP in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
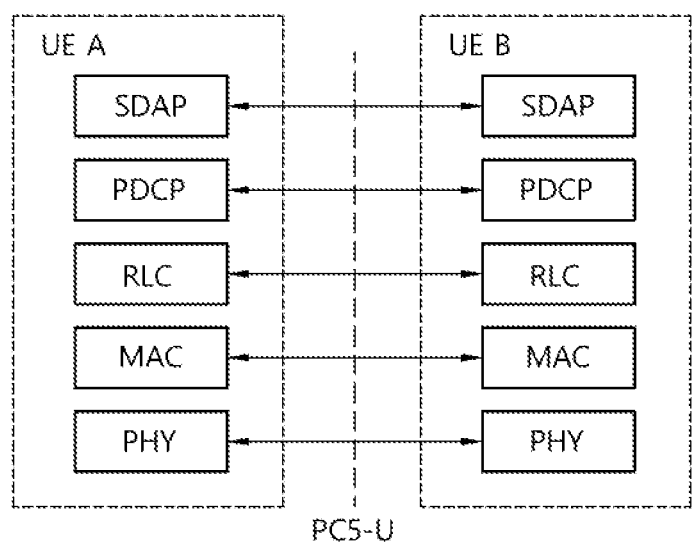
FIG. 8A and FIG. 8B show a radio protocol architecture for a SL communication in accordance with an embodiment of the present disclosure.
Figure 8B:
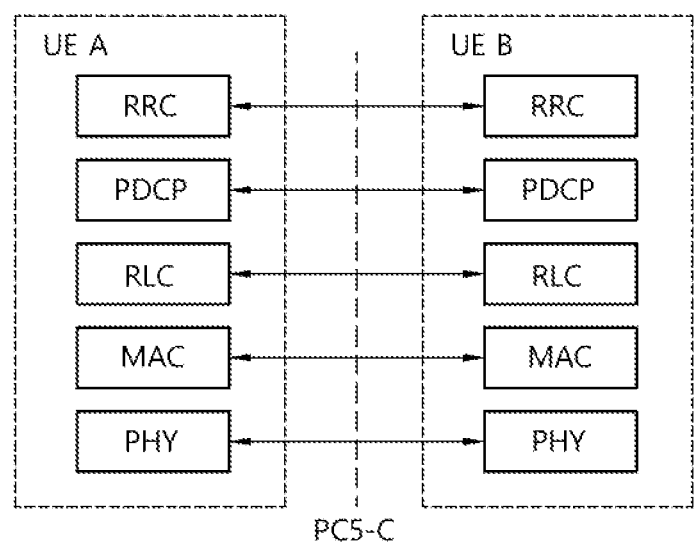

FIG. 8A and FIG. 8B show a radio protocol architecture for a SL communication in accordance with an embodiment of the present disclosure.

The embodiments of FIG. 8A and FIG. 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
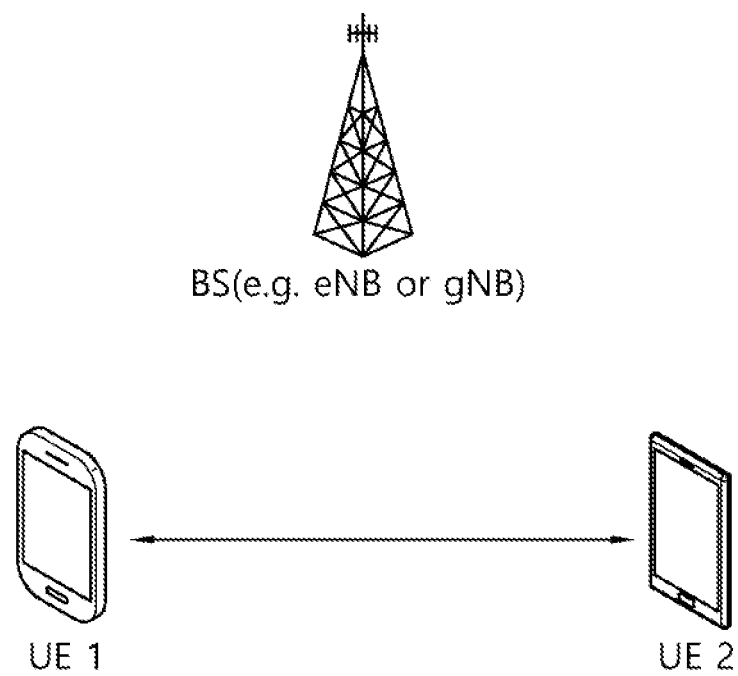
FIG. 9 shows a UE performing V2X or SL communication in accordance with an embodiment of the present disclosure.

FIG. 9 shows a UE performing V2X or SL communication in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
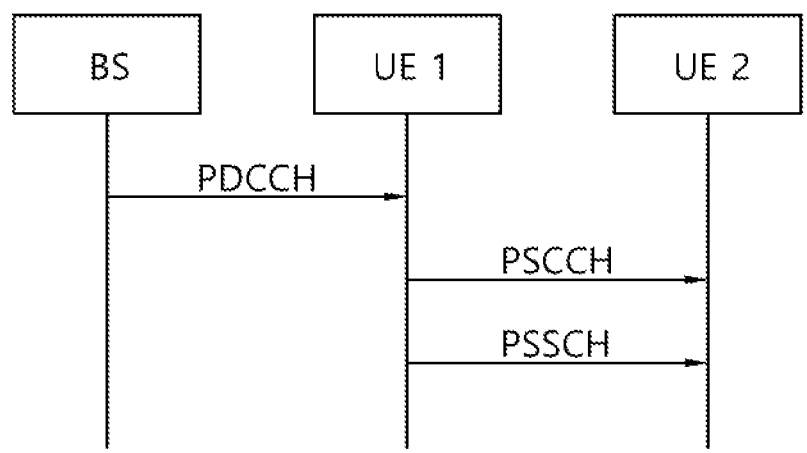
FIG. 10A and FIG. 10B show a procedure of performing V2X or SL communication by a UE based on a transmission mode in accordance with an embodiment of the present disclosure.
Figure 10B:
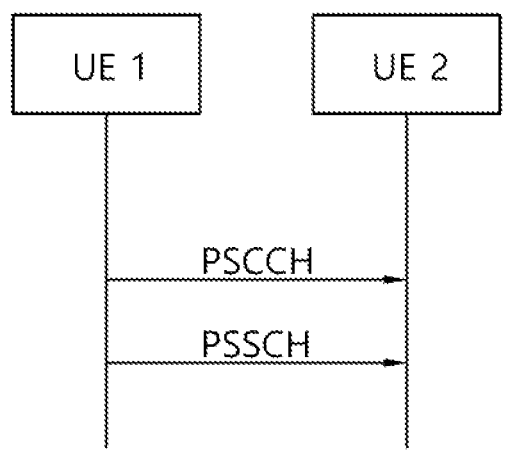

FIG. 10A and FIG. 10B show a procedure of performing V2X or SL communication by a UE based on a transmission mode in accordance with an embodiment of the present disclosure.

The embodiments of FIG. 10A and FIG. 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
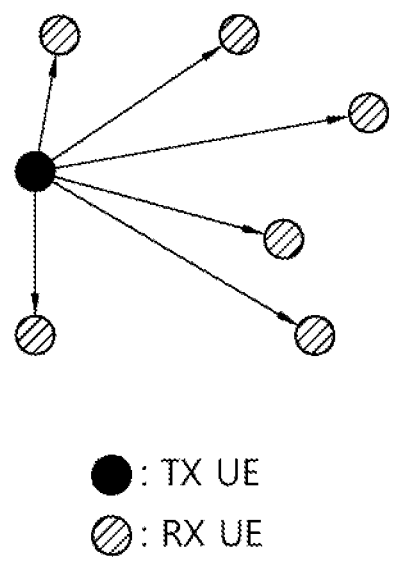
FIG. 11A through FIG. 11C show three cast types in accordance with an embodiment of the present disclosure.
Figure 11B:
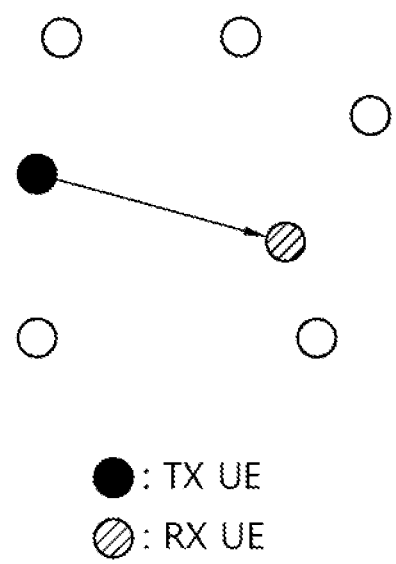
Figure 11C:
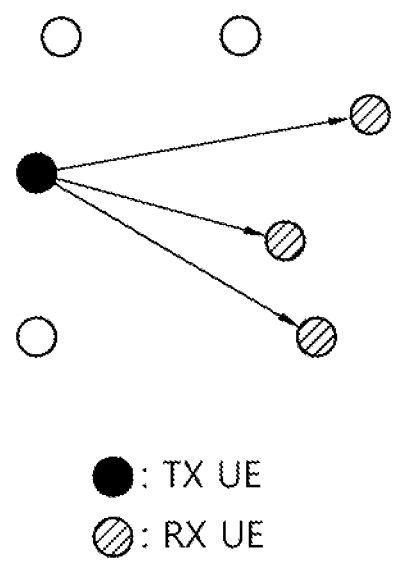

FIG. 11A through FIG. 11C show three cast types in accordance with an embodiment of the present disclosure.

The embodiments of FIG. 11A through FIG. 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, or the like) or V2X communication but also to sidelink communication or V2X communication based on a Uu interface (e.g., PUSCH, PDSCH, PDCCH, PUCCH, or the like).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, or the like). The receiving operation of the UE may include a decoding operation and/or receiving operation of a WAN DL channel and/or a WAN DL signal (e.g., PDCCH, PDSCH, PSS/SSS, or the like). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS, or the like). The transmitting operation of the UE may include a transmitting operation of a WAN UL channel and/or a WAN UL signal (e.g., PUSCH, PUCCH, SRS, or the like). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

In one embodiment, the following agreements made in RAN WG1 #98 meeting may be provided.
Agreements:
For Mode-1, support both same-carrier & cross-carrier scheduling from gNB to NR SL. Whether or not to have the cross-carrier scheduling indicator in the DCI given that there is only one SL carrier for a UE in Rel-16.
Agreements:
At least for dynamic grant, the timing and resource for PUCCH used for conveying SL HARQ feedback to the gNB are based on the indication(s) in the corresponding PDCCH. Details FFS.
Agreements:
DCI indicates the slot offset between DCI reception and the first sidelink transmission scheduled by DCI. The minimum gap between DCI and the first scheduled sidelink transmission is not smaller than the corresponding UE processing time. Details FFS
Agreements:
For unicast: TX UE reports contents received in PSFCH (i.e., ACK/NACK) to gNB. TX UE reports NACK if PSFCH is not detected. When generating the HARQ-ACK report for the transmissions corresponding to a grant, the TX UE uses the most recent PSFCH occasion (as working assumption) associated with the transmissions.
For groupcast option 1: TX UE reports ACK to the gNB if no PSFCH is detected. TX UE reports NACK to the gNB if at least one PSFCH (i.e., NACK) is detected. When generating the HARQ-ACK report for the transmissions corresponding to a grant, the TX UE uses the most recent PSFCH occasion (as a working assumption) associated with the transmissions. FFS the cases when TX UE does not transmit/receive due to prioritization.
For groupcast option 2: TX UE reports ACK if all expected PSFCH resources are received and carry ACK. TX UE reports NACK if at least one received PSFCH resource carries NACK or if no PSFCH is not detected. FFS the case with PSFCHs corresponding to multiple PSCCH/PSSCH transmissions before generating the HARQ-ACK report. FFS behavior when TX UE does not detect some expected PSFCH. FFS if no PSCCH/PSSCH is transmitted in a set of resources for configured grant. FFS whether/how to deal with the case of reaching the maximum number of HARQ re-transmissions for a TB.
Agreements:
NR supports reporting of multiple SL HARQ-ACKs in a single PUCCH resource. The Rel-15 procedures for multiplexing DL HARQ-ACKs are reutilized. Reports carry SL HARQ-ACKs for dynamic grants and/or configured grants. A UE does not expected to be indicated to transmit SL HARQ-ACK information for more than one SL configured grant in a same PUCCH. Note: A UE can be provided with multiple SL CGs with different (non-overlapping) slots for the corresponding PUCCH transmissions for SL HARQ-ACK reporting. NR supports multiplexing of SL HARQ-ACK(s) and DL HARQ-ACK(s) in a single PUCCH resource. A UE does not expected to be indicated to transmit HARQ-ACK information for SPS PDSCH receptions and SL configured grants in a same PUCCH. Note: A UE can be provided with multiple SL CGs/DL SPSs with different (non-overlapping) slots for the corresponding PUCCH transmissions for SL/DL HARQ-ACK reporting. The PUCCH resource used for reporting the multiplexed HARQ-ACKs is determined by the last DCI among all DCIs associated with the reported HARQ-ACKs (e.g., carrying a SL grant, scheduling a PDSCH, etc.). FFS whether the DL HARQ-ACK PUCCH resource set(s) or the SL HARQ-ACK PUCCH resource set(s) is used. For SL HARQ-ACK reporting, both Type-1 and Type-2 codebook are supported: The same codebook type is used for SL HARQ-ACK and DL HARQ-ACK reporting. SL HARQ-ACK bits are generated using the Rel-15 procedures and concatenated to the DL HARQ-ACK bits, which are independently generated using the corresponding procedures. FFS changes or restrictions to the Rel-15 procedures for generating the SL HARQ-ACK bits. FFS other details on how the codebook(s) are constructed. SL HARQ-ACK is reported in PUSCH when reporting in PUCCH overlaps with a PUSCH transmission. The Rel-15 procedures and signaling for multiplexing DL HARQ-ACKs in PUSCH are reutilized.

In this disclosure, we may discuss aspects on resource allocation for NR sidelink Mode 1.
Resource Allocation:
Unlike LTE Uu interface, slot format which includes downlink, uplink, and flexible symbols is newly defined in Rel. 15 NR Uu interface. The configuration of slot format is provided by cell specific or UE dedicated higher layer signaling, or provided by DCI if the corresponding UE is configured to monitor PDCCH for DCI format 2-0. In RAN1 #94 meeting, there was a discussion for sidelink resources on licensed carrier based on Rel. 15 signaling mentioned above, and several options were listed. Considering the coexistence with Rel. 15 NR Uu, the discussion based on Rel. 15 signaling for determining resources to be used for NR sidelink in licensed carrier can be a starting point. Discussion on Rel. 16 signaling, e.g., whether to adopt signaling for new part such as 'sidelink' in slot format indication, can be initiated afterwards.

Basically, sidelink needs to avoid downlink transmission in order to prevent performance loss due to interference from it. Regarding the slot format, one possible approach is to use uplink symbols which are determined by cell-specific semi-static D/U assignment. Then, there occurs an issue whether flexible symbols which are determined by cell-specific semi-static D/U assignment and can be configured as uplink symbols are used to sidelink or not. If sidelink uses the flexible symbols, sidelink resources may need to be dynamically (re)configured because the configuration for the flexible symbols can be dynamically provided by DCI. It would be rather challenging if dynamic resource (re)configuration is adopted especially for out-of-coverage UEs. Furthermore, inter-cell interference can be another issue due to the different configuration on flexible symbols in different cells. Therefore, at least uplink symbols configured by cell specific higher layer signaling can be used to NR sidelink and further study is needed to decide whether flexible symbols are used for NR sidelink.

Proposal 1: In shared licensed carrier, at least uplink symbols/slots configured by cell specific higher layer signaling in NR Uu is used for NR SL transmission. FFS whether or not to use flexible symbols/slots.

Furthermore, multiple type 2 configured grants to support various service type and/or latency requirement by using different set of periodicity and resource assignment can be considered. To save DCI overhead, it can be taken into account that single DCI is used for releasing multiple type-2 UL configured grants. Similar concept has been proposed and discussed in NR URLLC WI. SL operation may be developed in align with the relevant function defined in URLLC WI. The following agreement on URLLC WI at RAN1 #97 is the starting point for single DCI releasing multiple type-2 SL configured grants.

Agreements:

Support joint release in a DCI for two or more configured grant Type 2 configurations for a given BWP of a serving cell if the bit-length for indication which configurations released is no more than 4 bits and DCI size is not impacted by adopting joint release. FFS details.

Proposal 2: The release of multiple type-2 SL configured grants by a single SL DCI is supported. For activation, a type-2 SL configured grant is activated by a SL DCI.

For SL communication, gNB cannot know the status of the SL resources if UE does not report the relevant status regarding the SL communication channel. In mode 1, gNB can schedule a dynamic grant or a configured grant resources for SL if UE reports the SL channel sensing results to gNB. Based on the sensing results, gNB can allocate the resources with less interference or congestion level for example. In addition, for the configured grant case, gNB doesn't know whether the allocated resources are efficiently used by UE or not. For gNB to better understand the status of the usage of the configured grant resources, it's helpful for UE to periodically report to gNB the usage of the configured grant resources.

Proposal 3: UE reports the following assistance information to gNB: Sensing results, Usage of the configured resources For a dynamic grant and a configured grant case, if a TX UE used all the scheduled resources for transmission of a TB but failed to successfully transmit the TB, based on the HARQ feedback from the RX UE, the TX UE requests additional resources for retransmission and the gNB schedules a dynamic grant resources to the TX UE. When a dynamic grant schedules an additional resources for retransmission to a UE, the UE is expected to know the linkage between the transmission resources of a TB before additional scheduling and the retransmission resources by the dynamic grant. That is, the additional retransmission resources are used only for retransmission of the TB, of which the transmission was reported as failure. HARQ process ID and NDI could be used for such resource linkage for transmission of a TB. For configured grant case, additional information such as the configuration grant ID is needed to identify which configured grant is associated to the additionally scheduled retransmission resources.

Proposal 4: When additional resources for retransmission are requested by HARQ feedback report, a dynamic grant allocates the additional resources. The dynamic grant indicates which transmission resources are associated to the additional retransmission resources.

FFS details on the linkage for association (e.g. HARQ process ID, NDI and configured grant ID).

Search spaces and DCI format:

Search space for SL DCI monitoring can be configured to overlap or not to overlap with search space for Uu DCI monitoring. In configuring search space for SL DCI, following issues needs to be considered.

1) Number of monitored PDCCH (no more than predefined limit)

2) Number of monitored non-overlapped CCE (no more than predefined limit)

3) DCI size budget
   the total number of different DCI sizes configured to monitor is no more than 4 for the cell
   the total number of different DCI sizes with C-RNTI configured to monitor is no more than 3 for the cell By introducing SL DCI on top of Uu DCI, all three numbers above are affected and it's possible that they violates the predefined maximum limit. Regarding the DCI size budget, NR DCI size budget condition should be met when SL DCI search space is configured. In other words, NR DCI size budget includes the DCI size for SL scheduling.

Proposal 5: Existing NR DCI size budget is maintained for NR SL mode 1 UE.

For SL operation in licensed carrier, SL DCI search spaces are configured to fully overlap with Uu DCI search spaces to remove first two issues listed above. In addition, SL DCI sizes are aligned with Uu DCI sizes on the overlapped search space to remove the last issue. With this conditions, there is no issue regarding the BD/CCE limit and DCI size budget issue with introducing SL DCI search spaces in licensed carrier.

Proposal 6: In case of SL operation in licensed carrier, one of Uu DCI search spaces is used as SL DCI search space. SL DCI size is same as one of Uu DCI sizes in the relevant search space.

For SL operation in dedicated ITS carrier, SL DCI search space may or may not overlap with Uu DCI search space. If SL DCI search space does not overlap with Uu DCI search space, DCI search space monitoring operation may be dropped when the number of monitored PDCCH or CCE exceeds the limits. One of the solution to minimize dropping of SL DCI search space monitoring may be assign low index to the SL DCI search space. In this way, SL DCI monitoring operation may be kept as much as possible.

If SL DCI search space fully overlaps with the Uu DCI search space in dedicated ITS carrier, similar operation to the licensed carrier can be done to satisfy the DCI size budget. If the number of DCI sizes exceeds the DCI size budget and there are more than one Uu DCI sizes same or greater than SL DCI size, zero can be padded to SL DCI to align its size to closest Uu DCI size. If all Uu DCI sizes are smaller than SL DCI size, size alignment between SL DCI size and Uu DCI size needs to be done. There are several options for consideration. First method is to truncate the SL DCI size to be aligned with the Uu DCI size. Second method is to pad zeros to Uu DCI to align Uu DCI size with SL DCI size. Third method is to make SL DCI size configurable so that the DCI size alignment should be always possible. The last method is to make network ensure that SL DCI size is always equal to or smaller than Uu DCI size.

Proposal 7: When SL operation on ITS carrier is cross-carrier scheduled by SL DCI on licensed carrier, SL DCI search space is independently configured from Uu DCI search spaces. If SL DCI search space overlaps with one of the Uu DCI search spaces, size alignment between SL DCI and Uu DCI is performed.

As the number of SL search space is limited, it's desirable to support a shared search space between a dynamic grant and a configured grant. Considering the DCI size budget issue, it's also a natural consequence that the SL DCI sizes for a dynamic grant and a configured grant are aligned if the dynamic grant and the configured grant share a search space.

Proposal 8: Shared search space between dynamic and configured grant is supported. When a search space is shared between a dynamic grant and a configured grant, SL DCI sizes for dynamic and configured grant are aligned.

There are dynamic grant and type-2 configured grant, which are configured by NR SL DCI. To simplify the SL DCI format, a single DCI format is used for dynamic grant and type-2 configured grant. For differentiation between the DCIs for two types of grant, a different RNTI is used for each DCI format.

Proposal 9: Dynamic and type-2 configured grant use the same DCI format scrambled by a different RNTI.

BWP Switching:

It was agreed in RAN1 Adhoc 1901 that UE is not expected to use different numerology in the configured SL BWP and active UL BWP in the same carrier at a given time. Following the agreement, if UL BWP switching happens and the numerology of UL BWP changes, SL BWP is no longer valid and deactivated. If numerology doesn't change due to UL BWP switching, SL configured grant type-1 or type-2 resources are considered as valid after UL BWP switching. If DL BWP is switched from one to another, SL configured grant type-1 or type-2 resources are always considered as valid. As for the PUCCH resources for SL HARQ feedback report from transmitter UE to gNB, if UL/DL BWP is switched to a new BWP, the PUCCH resources are considered as invalid and released for other use.

Proposal 10: If UL BWP is switched to another UL BWP with numerology different from that of configured SL BWP, SL TX/RX operation is deactivated.

Proposal 11: If mode 1 UE has SL configured grant, it assumes that such grant is still valid even after UL/DL BWP switching.

Proposal 12: Mode 1 UE assumes that PUCCH resource for SL HARQ feedback report is released if PUCCH UL BWP is switched to another UL BWP, or if DL BWP paired with PUCCH UL BWP is switched to another DL BWP.

SL HARQ feedback:

According to the agreement, for selecting PUCCH offset/resource and format in UL, the Rel-15 procedure and signaling for DL HARQ-ACK are reused for dynamic grant and configured grant type-2 while RRC is used to configure PUCCH offset/resource and format in UL. In other words, for dynamic grant and configured type-2, RRC will be used to configure the set of PUCCH offsets and the set of PUCCH resources, respectively. Then, DCI for dynamic SL grant or for configured type-2 activation will indicate one of PUCCH offset among the set of PUCCH offsets and one of PUCCH resource among the set of PUCCH resources. In Uu link, a PUCCH resource includes the following parameters:

a PUCCH resource index
an index of the first PRB prior to frequency hopping or for no frequency hopping
an index of the first PRB after frequency hopping
an indication for intra-slot frequency hopping
a configuration for PUCCH format, from PUCCH format 0 though PUCCH format 4

In this case, since the concept of PUCCH resource already includes PUCCH format, DCI does not need to indicate PUCCH format explicitly.

Figure 12:
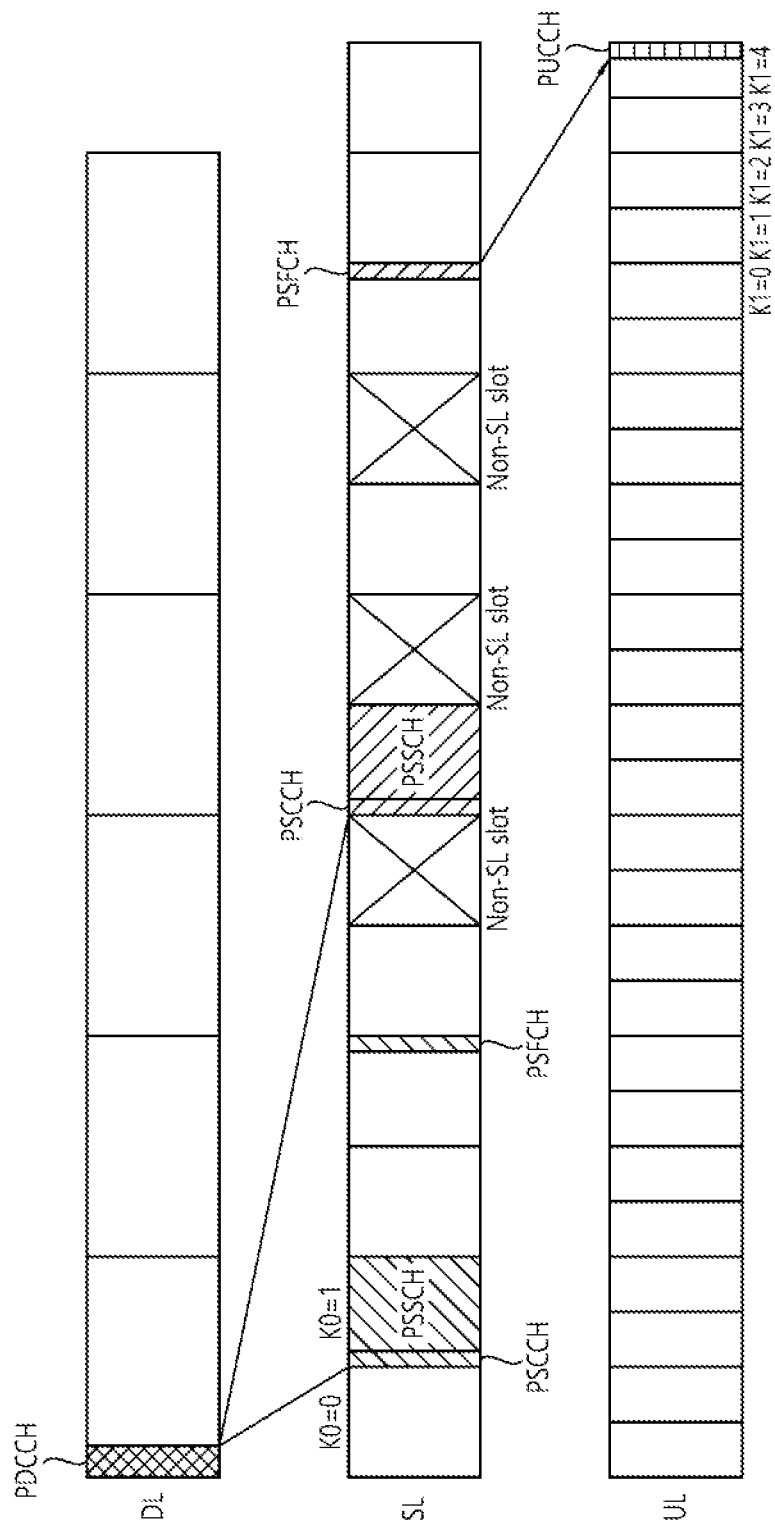
FIG. 12 shows an example of PDCCH-to-SL resources and SL resources-to-PUCCH transmission timing.

FIG. 12 shows an example of PDCCH-to-SL resources and SL resources-to-PUCCH transmission timing.

Proposal 13: For selecting PUCCH offset/resource and format in UL,

Set of PUCCH offsets is RRC-configured. DCI for dynamic grant of SL resources indicates a PUCCH offset from the set. DCI activating of configured grant Type-2 for SL resources indicates a PUCCH offset from the set.

Set of PUCCH resources is RRC-configured. DCI for dynamic grant of SL resources indicates a PUCCH resource from the set. DCI activating configured grant Type-2 for SL resources indicates a PUCCH resource from the set.

On the reference point for the PUCCH transmission timing, the reference point is the slot containing PDSCH in NR Uu link. That is, the timing offset (K1) is the slot gap between slot where PDSCH is received and slot where the associated PUCCH will be transmitted. There are several options for a reference point for PUCCH to report SL HARQ feedback.

First, a slot containing PDCCH that schedules SL resources can be a reference point. In this case, K1 is defined as a gap from a slot containing PDCCH to a slot containing PUCCH. The K1 value needs to be large enough to accommodate all the processing times for PSCCH, PSSCH, and PSFCH transmission.

Second, a slot containing PSCCH or PSSCH can be a reference point. In this case, K1 is defined as gap from a slot containing PSCCH or PSSCH to a slot containing PUCCH. There is no misunderstanding between UE and gNB on PSCCH and PSSCH timing. Since the PSCCH and PSSCH slot position is behind that of PDCCH, the K1 value is smaller than that of the first case above. It's necessary that the K1 value is determined to accommodate the processing time for PSSCH and/or PSFCH transmissions. In addition, when the PSFCH resource period N is more than one slot, TX UE may not know HARQ states of PSSCH when it does not receive the associated PSFCH from the RX UE.

Third, a slot containing PSFCH can be a reference point. In this case, K1 is defined as slot gap from a slot containing PSFCH to a slot containing PUCCH. As the timing of PSFCH is derived from that of PSCCH/PSSCH, UE and gNB have same understanding on the PSFCH timing. After receiving PSFCH, TX UE can decide PUCCH timing for SL HARQ feedback report to gNB. Since the payload to be transmitted on PUCCH will be available at TX UE side after the TX UE receives PSFCH from the RX UE, it would be straightforward that the reference point for the PUCCH transmission timing is the slot where the TX UE receives PSFCH associated with PSSCH transmission(s) indicated by the DCI.

In addition, in case when different numerologies are used between PDSCH and PUCCH, K1 is the slot offset with the numerology of UL, and K1=0 indicates the latest slot overlapping with the PDSCH reception. Sidelink on a serving cell and uplink on PCell can also have different numerology, and the principle of PDSCH-to-PUCCH could be reused for sidelink-to-PUCCH as shown in FIG. 12. On the resource type (e.g. physical or logical slot) for the PUCCH offset, since PUCCH would always not occur in a resource pool, counting offset would be based on physical slots. In this case, UE expects that the indicated or configured PUCCH transmission timing is available for PUCCH transmission.

Proposal 14: For reporting SL HARQ-ACK to the gNB, The numerology of PUCCH is used for interpreting the timing of transmission in PUCCH. PUCCH offset of 0 indicates the latest slot overlapping with the slot containing the PSFCH occasion associated with the last resource in the set of resources provided by a dynamic grant of a configured grant. PUCCH offset is defined in physical slot Alternatively, it can be considered that SL DCI can indicate reference K0, reference DAI, and reference PDSCH, and the reference PDSCH can be a reference point for the PUCCH offset to directly reuse Rel-15 procedure and signaling for DL HARQ-ACK for reporting SL HARQ-ACK to the gNB.

Meanwhile, depending on the DL/UL traffic, PUCCH transmission could be canceled to reuse the resources for PUCCH for other purposes such as DL or UL transmissions associated with urgent services. In this case, it can be considered that PUCCH transmission for SL HARQ feedback is enabled or disabled dynamically. For instance, PUCCH resource indicator and/or PUCCH transmission timing in DCI or RRC can indicate 'no PUCCH transmission'. However, in our view, even though SL HARQ-ACK feedback on PUCCH transmission is disabled, it is not necessary to always disable SL HARQ-ACK feedback no PSFCH since this SL HARQ-ACK feedback on PSFCH would be used for SL HARQ operation and potential release of unused retransmission resources.

Proposal 15: SL DCI indicates whether PUCCH SL HARQ feedback is actually transmitted for dynamic grant and CG type 2. For CG type 1, the actual transmission of PUCCH for SL HARQ feedback is RRC-configured.

On PSFCH TX/RX collision issue, it is possible that PSFCH TX is prioritized over PSFCH RX. In other words, even though the RX UE transmit SL HARQ-ACK on PSFCH to the TX UE, the TX UE does not receive it. In this case, it seems straightforward that the SL HARQ-ACK state(s) associated with the PSFCH(s) which are not received by the TX UE due to the prioritization are treated as NACK state even for the groupcast option 1.

Proposal: For unicast, groupcast, in cases when TX UE does not receive due to prioritization, TX UE reports NACK to gNB.

On groupcast option 2, a number of RX UEs will use separate PSFCH resources to transmit their own SL HARQ-ACK feedback for the same PSCCH/PSSCH transmission. In this case, some RX UE may fail to detect SCI, and then the RX UE would not transmit PSFCH to the TX UE. Meanwhile, it is agreed that TX UE reports NACK if at least one received PSFCH resource carriers NACK. In those points of views, it can be considered that the case where at least one RX UE fails to detect SCI is treated as NACK state.

In one embodiment, a method for performing sidelink communication by a TX UE is provided. The method includes: transmitting physical sidelink control channel (PSCCH) or physical sidelink shared channel (PSSCH) to RX UE, transmitting physical uplink control channel (PUCCH) or physical uplink shared channel (PUSCH) to a base station and transmitting hybrid automatic repeat request negative acknowledgement (HARQ NACK) to the base station based on physical sidelink feedback channel (PSFCH) being not received from the rX UE, wherein a first time resource for transmitting the PUCCH or the PUSCH and a second time resource for receiving the PSFCH are overlap with each other, and wherein the PSFCH is not received from the RX UE based on a priority value related to the reception of the PSFCH being larger than a priority value related to the transmission of the PUCCH or the PUSCH.

Figure 13:
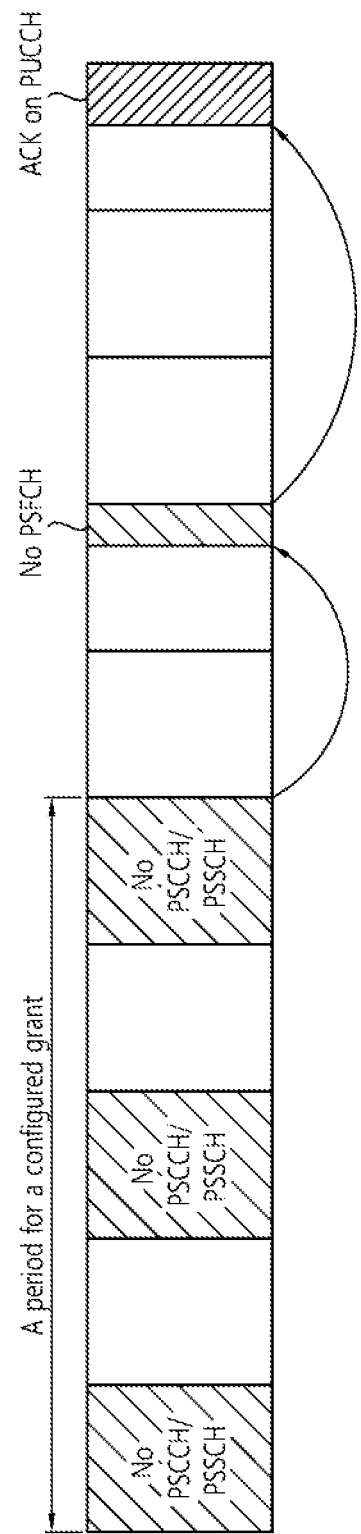
FIG. 13 shows an example of reporting SL HARQ-ACK for a SL configured grant on PUCCH.

FIG. 13 shows an example of reporting SL HARQ-ACK for a SL configured grant on PUCCH.

Proposal: For groupcast Option 2, when TX UE does not detect some expected PSFCH, TX UE reports NACK to gNB Regarding configured grant, TX UE may or may not transmit PSCCH/PSSCH to RX UE(s). In this case, RX UE would not transmit PSFCH since it does not receive PSCCH and PSSCH from the TX UE. Then, if the TX UE report NACK to the gNB for the set of configured SL resources in a period, gNB may make a wrong decision on scheduling retransmission resources or modifying configured SL resources. In this point of view, it can be considered that TX UE reports ACK if no PSCC/PSSCH is transmitted in a set of resources within a period for configured grant as shown in FIG. 13.

Proposal: if no PSCCH/PSSCH is transmitted in a set of resources within a period for configured grant, TX UE reports ACK to gNB On maximum number of HARQ (re-)transmission for a TB, it would be useful to manage SL resources efficiently. To be specific, considering the maximum number of HARQ (re-)transmission for a TB, gNB may not transmit excessive number of DCI for dynamic SL grant for a TB. Moreover, in case of configured grant, since there is no restriction on how to use configured resources with respect to the same or different TBs, the TX UE can efficiently use the configured SL resources based on the number of (re-)transmissions of a TB. In those of points of views, it can be considered that the concept of the maximum number of HARQ (re-)transmission for a TB is also applied to Mode 1 operation on top of Mode 2 operation.

Proposal: For mode 1 operation, RRC configuration can limit the maximum number of HARQ (re-)transmissions of a TB The set of values is the same as that of Mode 2 operation. If no configuration, the maximum number is not specified In this case, the maximum number of HARQ (re-)transmission for a TB could be used for deciding SL HARQ-ACK to be reported to the gNB. To be specific, gNB can't know TX UE's starting timing of transmission for a TB since the TX UE can use any resource occasion of configured grant for its initial transmission of a TB. In other words, gNB can't know how many transmissions are performed for a TB at TX UE side. At that time, the number of (re-)transmission for a certain TB reaches the configured maximum value, the TX UE does not need to have additional resources for the retransmission of the TB. In other words, for this case, the TX UE can report ACK to gNB regardless of whether the TX UE receives PSFCH carrying ACK for the TB.

Proposal: If the maximum number of HARQ re-transmission for a TB is configured, in case of reaching the maximum number of HARQ re-transmissions for a TB, TX UE reports ACK to gNB.

For dynamic SL grant, a single DCI can indicate more than one SL resources to be used for a TB. If the time gap between the indicated SL resources is sufficiently large, it would be beneficial that each indicated SL resources have the associated PSFCH resource. To be specific, when the TX UE use the first indicated SL resources for PSCCH/PSSCH transmission, and the TX UE receives PSFCH carrying ACK for the PSCCH/PSSCH, the TX UE can skip the second SL resources for power saving. For configured grant, within a configured period, more than one SL resources can be configured, and they can be used for none or one or multiple TB(s). When each configured SL resources have the associated PSFCH resource, then the TX UE can decide whether the configured resources will be used for new TB transmission or retransmission based on the received PSFCH(s).

Figure 14:
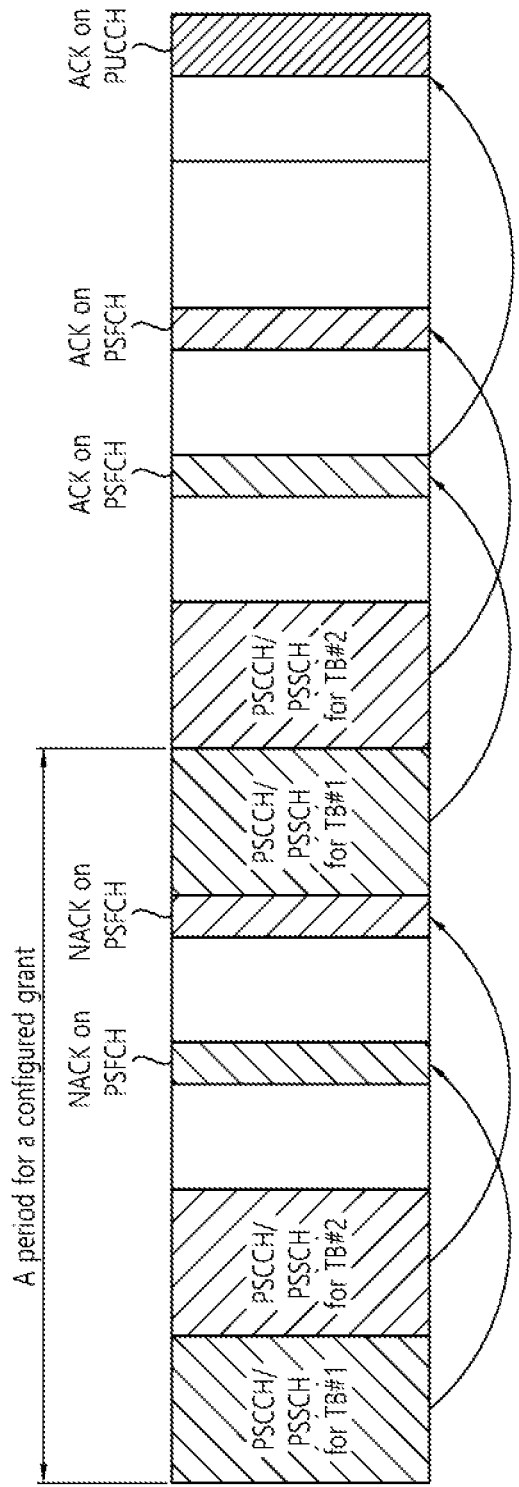
FIG. 14 shows an example of SL HARQ-ACK reporting to gNB for the case with PSFCHs corresponding multiple PSCCH/PSSCH transmissions.

FIG. 14 shows an example of SL HARQ-ACK reporting to gNB for the case with PSFCHs corresponding multiple PSCCH/PSSCH transmissions.

Proposal: For dynamic SL grant and configured SL grant, each SL resources for PSCCH/PSSCH can have the associated PSFCH resource.

In this case, it is necessary to define how to generate SL HARQ-ACK reported to the gNB. For dynamic SL grant, since the multiple PSCCH/PSSCH transmission will be associated with the same TB, 1 bit of SL HARQ-ACK is enough for the reporting. On the other hand, for configured grant, a set of configured SL resources within a period could be associated with different TBs. In this case, multiple PSFCH associated with the set of configured SL resources would carry different SL HARQ-ACK states. Considering PUCCH overhead and specification work load, it can be considered that 1 bit of SL HARQ-ACK is supported for configured grant, and this 1 bit information is derived based on the multiple SL HARQ-ACK states conveyed on the multiple PSFCHs. For simplicity, it can be considered that the last SL HARQ-ACK state of any TB is NACK, then the TX UE will report NACK to the gNB for the configured grant. For example, if there are 4 SL resources are configured within a period, and if the TX UE use these SL resources for TB #1, TB #2, TB #1, and TB #2, respectively. Then, if the SL HARQ-ACK states for the 4 SL resources are {NACK, NACK, ACK, ACK}, the TX UE will report ACK to the gNB since the two TBs are successively decoded by the RX UE as shown in FIG. 14.

Proposal: For unicast, groupcast option 1, and groupcast option 2, support 1 bit of SL HARQ-ACK per dynamic grant or configured grant.

For the case with PSFCHs corresponding to multiple PSCCH/PSSCH transmissions before generating the HARQ-ACK report, TX UE reports ACK if the TX UE receives PSFCH carrying ACK for each TB transmitted by the TX UE. TX UE reports ACK if no PSCCH/PSSCH is transmitted in a set of resources. TX UE reports NACK, otherwise.

According to the agreement, NR supports multiplexing of SL HARQ-ACK(s) and DL HARQ-ACK(s) in a single PUCCH resource. At the same time, it is also agreed that the same codebook type is used for SL HARQ-ACK and DL HARQ-ACK reporting, and SL HARQ-ACK bits are generated using the Rel-15 procedures and concatenated to the DL HARQ-ACK bits, which are independently generated using the corresponding procedures. In this case, it is necessary to investigate how to modify the Rel-15 procedures for multiplexing DL HARQ-ACKs for multiplexing SL HARQ-ACKs.

Figure 15:
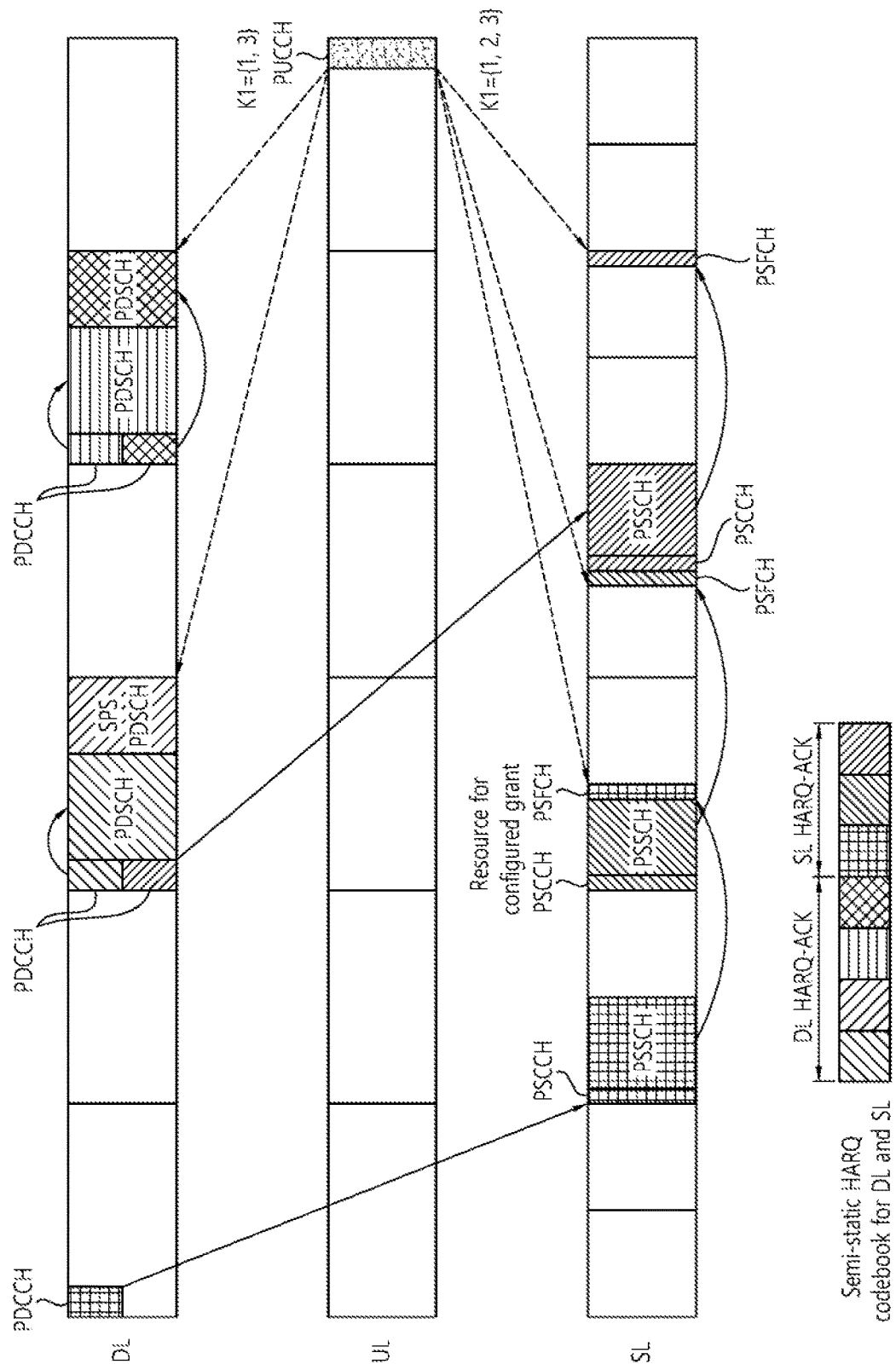
FIG. 15 shows an example of semi-static HARQ codebook for DL and SL.

FIG. 15 shows an example of semi-static HARQ codebook for DL and SL.

For semi-static HARQ codebook, it is necessary to decide how to replace PDSCH time resource, and numerology of PDSCH. In addition, since SL HARQ-ACK bits will be concatenated to the DL HARQ-ACK bits, it does not need to consider CBG-based HARQ-ACK feedback and 2 TB case.

Proposal: For multiple SL HARQ-ACKs in a single PUCCH resource, in case of Type-1 codebook (i.e. semi-static codebook), A set of slot timing values K_1 for Uu link is replaced with a set of K_1 values for sidelink. PDSCH time resource is replaced with the last PSFCH occasion associated with a SL grant. Numerology of PDSCH is replaced with numerology of sidelink. Tdd-UL-DL-ConfigurationCommon and tdd-UL-DL-ConfigurationDedicated are replaced with parameter(s) to indicate resources available for SL. TB-based HARQ-ACK feedback is used for sidelink even though PDSCH-CodeBlockGroupTransmission is provided. 1 TB is used for SL HARQ-ACK feedback for sidelink even though maxNrofCodeWordsScheduledByDCI is 2.

Note that in case of semi-static HARQ codebook, bit position of SPS PDSCH reception is determined based on the position of the PDSCH time resource. In a similar manner, bit position of the configured SL resource could be determined based on the position of the PSFCH occasions. FIG. 15 shows an example of semi-static HARQ codebook. According to the agreement, in FIG. 15, either HARQ-ACK bit with purple color or HARQ-ACK with green color will have meaningful value.

Considering multiplexing SL HARQ-ACK bits and other UCI, it is necessary to define the order of each UCI. For simplicity, we propose the order of UCI mapping would be based on the UCI type (e.g. HARQ-ACK, SR, or CSI).

Proposal: In case of Type-1 codebook (i.e. semi-static codebook), DL HARQ-ACK/SL HARQ-ACK/SR for UL/SR for SL/CSI are located with following order:

HARQ-ACK for PDSCH scheduled by PDCCH or for PDCCH indicating DL SPS release or for SPS PDSCH reception HARQ-ACK for PDCCH scheduling SL grant or for configured grant for SL SR for UL (if present)

SR for SL (if present)

CSI (if present)

Figure 16:
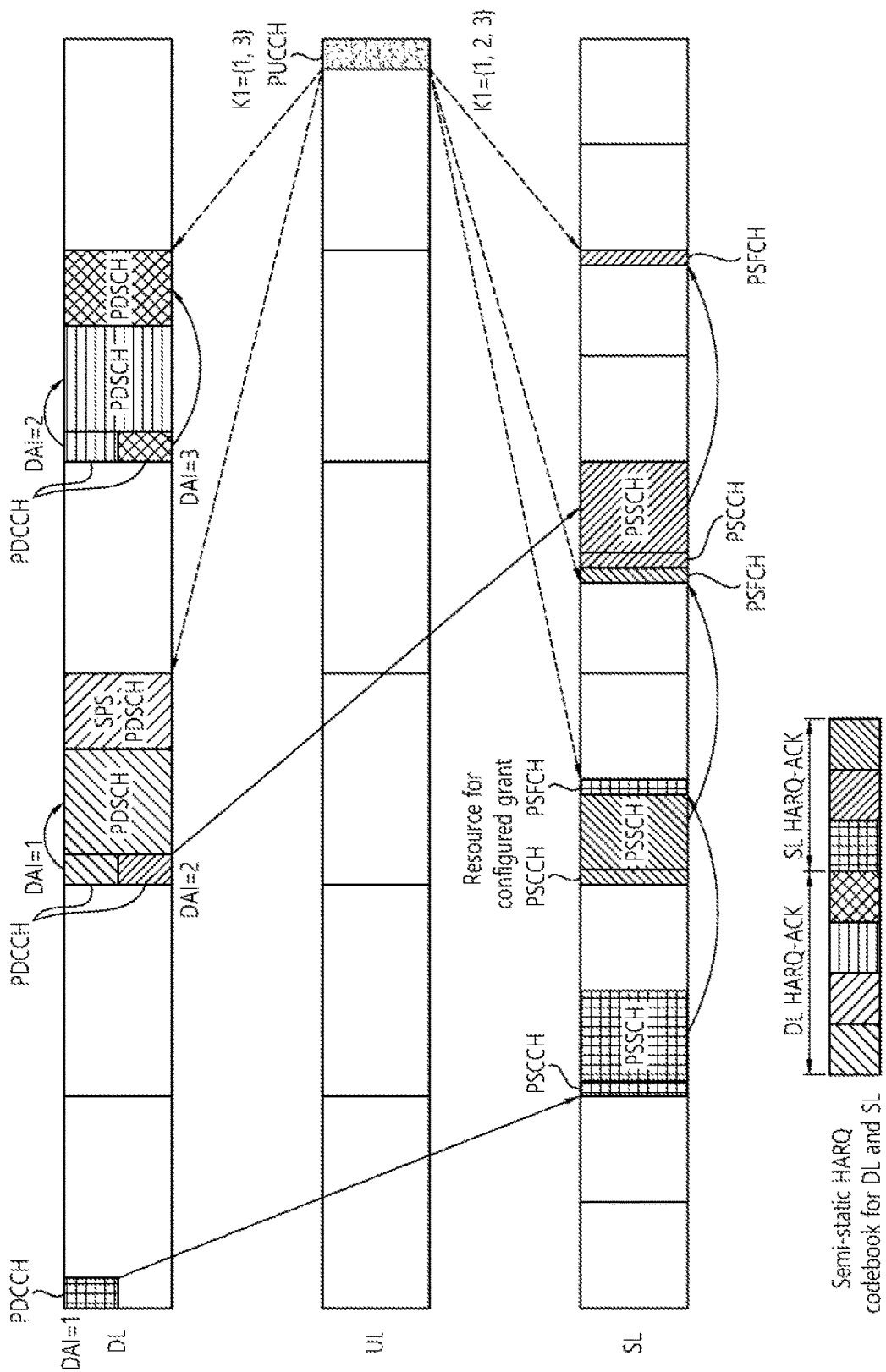
FIG. 16 shows an example of dynamic HARQ codebook for DL and SL.

FIG. 16 shows an example of dynamic HARQ codebook for DL and SL.

For dynamic HARQ codebook, it is necessary to decide how to perform DAI counting and how to replace the set of PDCCH monitoring occasions, and SPS PDSCH reception. In addition, since SL HARQ-ACK bits will be concatenated to the DL HARQ-ACK bits, it does not need to consider CBG-based HARQ-ACK feedback and 2 TB case.

Proposal: For multiple SL HARQ-ACKs in a single PUCCH resource, in case of Type-2 codebook (i.e. dynamic codebook), Counting DAI for SL HARQ-ACK feedback is independent on counting DAI for DL HARQ-ACK feedback. Total DAI presents in DCI for SL grant when the number of serving cells for NR sidelink is more than one. The set of PDCCH monitoring occasions for DCI format 1_0 or DCI format 1_1 for scheduling PDSCH receptions or SPS PDSCH release is replaced with the set of PDCCH monitoring occasions for DCI for SL dynamic grant. It is defined as the union of PDCCH monitoring occasions where DCI for SL grant is available across active DL BWPs of configured serving cells. TB-based HARQ-ACK feedback is used even though PDSCH-CodeBlockGroupTransmission is provided. 1 TB is used for SL HARQ-ACK feedback even though maxNrofCodeWordsScheduledByDCI is 2. SPS PDSCH reception is replaced with PSSCH reception associated with Configured grant.

Note that in case of dynamic HARQ codebook, HARQ-ACK bit for SPS PDSCH reception is concatenated to HARQ-ACK bits for PDSCH scheduled by PDCCH since SPS PDSCH would not have PDCCH except for the activation, so DAI-based bit ordering cannot be used. In a similar manner, HARQ-ACK bit of the configured SL resource would be concatenated to the HARQ-ACk bits for dynamic SL grants. FIG. 16 shows an example of dynamic HARQ codebook. According to the agreement, in FIG. 16, HARQ-ACK bit with purple color or HARQ-ACK with green color will not be transmitted simultaneously.

Considering multiplexing SL HARQ-ACK bits and other UCI, it is necessary to define the order of each UCI. For simplicity, we propose the order of UCI mapping would be based on the UCI type (e.g. HARQ-ACK, SR, or CSI).

Proposal: In case of Type-2 codebook (i.e. semi-static dynamic codebook), DL HARQ-ACK/SL HARQ-ACK/SR for UL/SR for SL/CSI are located with following order:
- HARQ-ACK for PDSCH scheduled by PDCCH or for PDCCH indicating DL SPS release
- HARQ-ACK for PDCCH scheduling SL grant
- HARQ-ACK for SPS PDSCH reception
- HARQ-ACK for PDCCH scheduling SL grant
- HARQ-ACK for configured grant for SL SR for UL
- SR for SL (if present)
- CSI (if present)

In NR Uu link, some portion of UCI could be dropped depending on the maxCodeRate, and the number PRB used for the actual PUCCH transmission is also depending on the maxCodeRate. Furthermore, depending on the number of UCI information bits, the set of PUCCH resources to be used can be also changed. In this case, for simplicity, it can be considered that the number of UCI information bits additionally includes the number of SL HARQ-ACK bits reported to gNB. Next, priority of SL HARQ-ACK bits reported to gNB is the same as that of DL HARQ-ACK bits. In other words, SL HARQ-ACK bits will not be dropped due to the maxCodeRate.

On the PUCCH resource determination, it is agreed that the PUCCH resource used for reporting the multiplexed HARQ-ACKs is determined by the last DCI among all DCIs associated with the reported HARQ-ACKs (e.g., carrying a SL grant, scheduling a PDSCH, etc.). Meanwhile, considering dynamic indication of PDSCH timing and PUCCH timing, it is possible that the more than one DCI can occur the same monitoring occasion. In this case, it would be ambiguous which DCI is last one to decide PUCCH resource. In NR Uu link, it can be resolved when the more than one last DCIs indicate the same PUCCH resource. However, if SL DCI and DL DCI occur in the same monitoring occasion, and if PUCCH resource set configurations are different between DL DCI and SL DCI, it would be necessary to define some rules for tie-break.

Proposal: For PUCCH resource determination, if last DCI for SL grant and last DCI scheduling PDSCH are transmitted in the same PDCCH monitoring occasion, down-select one of followings:
- Alt 1: PUCCH resource indicated by DCI scheduling PDSCH is used
- Alt 2: PUCCH resource indicated by DCI for SL grant is used
- Alt 3: PUCCH resource with larger maximum coding rate is used
- Alt 4: PUCCH resource indicated by DCI associated with the smallest CCE index for PDCCH.

Alternatively, if SL HARQ-ACK PUCCH resource set is always the same as DL HARQ-ACK PUCCH resource set, this problem can be easily resolved by indicating the same value of PUCCH resource indicator as in NR Uu link.

In this disclosure, we provide more proposals and observations are given as follows:

Proposal 1: In shared licensed carrier, at least uplink symbols/slots configured by cell specific higher layer signaling in NR Uu is used for NR SL transmission. FFS whether or not to use flexible symbols/slots.

Proposal 2: The release of multiple type-2 SL configured grants by a single SL DCI is supported. For activation, a type-2 SL configured grant is activated by a SL DCI.

Proposal 3: UE reports the following assistance information to gNB:
- Sensing results
- Usage of the configured resources Proposal 4: When additional resources for retransmission are requested by HARQ feedback report, a dynamic grant allocates the additional resources. The dynamic grant indicates which transmission resources are associated to the additional retransmission resources.

Proposal 5: Existing NR DCI size budget is maintained for NR SL mode 1 UE.

Proposal 6: In case of SL operation in licensed carrier, one of Uu DCI search spaces is used as SL DCI search space. SL DCI size is same as one of Uu DCI sizes in the relevant search space.

Proposal 7: When SL operation on ITS carrier is cross-carrier scheduled by SL DCI on licensed carrier, SL DCI search space is independently configured from Uu DCI search spaces. If SL DCI search space overlaps with one of the Uu DCI search spaces, size alignment between SL DCI and Uu DCI is performed.

Proposal 8: Shared search space between dynamic and configured grant is supported. When a search space is shared between a dynamic grant and a configured grant, SL DCI sizes for dynamic and configured grant are aligned.

Proposal 9: Dynamic and type-2 configured grant use the same DCI format scrambled by a different RNTI.

Proposal 10: If UL BWP is switched to another UL BWP with numerology different from that of configured SL BWP, SL TX/RX operation is deactivated.

Proposal 11: If mode 1 UE has SL configured grant, it assumes that such grant is still valid even after UL/DL BWP switching.

Proposal 12: Mode 1 UE assumes that PUCCH resource for SL HARQ feedback report is released if PUCCH UL BWP is switched to another UL BWP, or if DL BWP paired with PUCCH UL BWP is switched to another DL BWP.

Proposal 13: For CG type 1, slot offset between PSFCH reception and the corresponding PUCCH transmission is RRC-configured.
- Numerology of the indicated slot offset is the numerology of PUCCH.
- Slot offset of 0 indicates the latest slot overlapping with the PSFCH reception.

Proposal 14: For dynamic grant and CG type 2, DCI indicates slot offset between PSFCH reception and the corresponding PUCCH transmission.
- Numerology of the indicated slot offset is the numerology of PUCCH.
- Slot offset of 0 indicates the latest slot overlapping with the PSFCH reception.

Proposal 15: SL DCI indicates whether PUCCH SL HARQ feedback is actually transmitted for dynamic grant and CG type 2. For CG type 1, the actual transmission of PUCCH for SL HARQ feedback is RRC-configured.

Proposal 16: A single PUCCH resource only carries all the SL HARQ feedbacks received on a single PSFCH slot from a single TX UE point of view.

Proposal 17: In Rel-16 NR sidelink, support only TDMed transmission between SL HARQ feedback and DL HARQ feedback.

Proposal 18: When DL HARQ feedback and SL HARQ feedback occur in the same timing, TX UE select one type of HARQ feedback. FFS: Priority rule (e.g. L1-priority, logical channel priority, link type, UE implementation)

Proposal 19: For unicast and groupcast with Option 2, when HARQ feedback is enabled, TX UE transmits NACK on PUCCH if the TX UE receives at least one NACK on PSFCH or no PSFCH for the PSSCH transmitted by the TX UE.

TX UE transmits ACK on PUCCH if the TX UE receives ACK on PSFCH(s) only for the PSSCH transmitted by the TX UE.

TX UE transmits no PUCCH if TX UE transmit no PSSCH.

Proposal 20: For groupcast with Option 1, when HARQ feedback is enabled,

TX UE transmits NACK on PUCCH if the TX UE receives at least one NACK on PSFCH for the PSSCH transmitted by the TX UE.

TX UE transmits ACK on PUCCH if the TX UE receives no PSFCH for the PSSCH transmitted by the TX UE.

TX UE transmits no PUCCH if TX UE transmit no PSSCH.

Proposal 21: When HARQ feedback is disabled, or PSSCH is associated with broadcast, TX UE transmits ACK on PUCCH if the TX UE successfully decode DCI scheduling SL resource(s).

Observation: If SL HARQ feedback on PUCCH is transmitted for each PSSCH transmission indicated by a SCI/DCI for a TB, it can cause signaling overhead for timing and PUCCH resource indications.

Proposal 22: Whether SL HARQ feedback on PUCCH is transmitted for each PSSCH transmission indicated by a SCI/DCI for a TB is determined by RRC configuration.

In RAN1 #98bis meeting and email discussions, followings are agreed for physical layer procedure for Rel-16 NR sidelink:

Working Assumption:
For the power limited case in supporting simultaneous sidelink and uplink transmissions (SL carrier is different from UL carrier), If sidelink transmission is prioritized over uplink transmission, the UE shall adjust the uplink transmission power before the start of the transmission such that its total transmission power does not exceed on any overlapped portion. In this case, calculation of the adjustment to the uplink transmission power is not specified. If uplink transmission is prioritized over sidelink transmission, the UE shall adjust the sidelink transmission power before the start of the transmission such that its total transmission power does not exceed on any overlapped portion. In this case, calculation of the adjustment to the sidelink transmission power is not specified. Total sidelink transmit power is the same in the symbols used for actual PSCCH/PSSCH transmissions in a slot in case of simultaneous transmission of sidelink and uplink. PSCCH/PSSCH transmissions can be dropped in some symbols when there are uplink transmissions with higher priority and the UE cannot keep the same sidelink transmission power in the symbols.

Selection of the dropped symbols is up to UE implementation where the dropped symbols should include the overlapping symbols. If the simultaneous transmission of sidelink and uplink is beyond the UE capability, the one not prioritized can be dropped.

FFS: when to prioritize which transmission
FFS: how to address UE processing time
FFS: whether there is a case of dropping some symbols of uplink transmissions
Whether/how to address RF transient period is up to RAN4.

Agreements:
For PSFCH power control, It is supported that the open-loop power control is based on the pathloss between PSFCH TX UE and gNB (if PSFCH TX UE is in-coverage): The nominal power and alpha for PSFCH power control are configured separately from the parameters used for PSCCH/PSSCH power control.

(working assumption) Sidelink pathloss based PSFCH power control is not supported.

Agreements:
L3-filtered sidelink RSRP reporting (from RX UE to TX UE) for open-loop power control for PSCCH/PSSCH uses higher layer signaling. Details (e.g., reporting layer, triggering condition, etc.) are up to RAN2. FFS: Other details Agreements:
For SL-RSRP measurement for SL open-loop power control, PSSCH DMRS is used Agreements:
For CQI/RI reporting on PSSCH: Higher layer signaling (e.g. MAC CE) is used for CQI/RI reporting. Details up to RAN2. SL CQI/RI measurement and derivation are based on the existing physical layer procedure for Uu Agreements:
For PSSCH-to-HARQ feedback timing, K is the number of logical slots (i.e. the slots within the resource pool)

Working Assumption:
For TX-RX distance-based HARQ feedback for groupcast Option 1, Zone is (pre-)configured with respect to geographical area, and Zone ID associated with TE UE's location is indicated by SCI. Details FFS. Note: this does not intend to impact the discussion on the zone based resource allocation.

Agreements:
For the communication range requirement for TX-RX distance-based HARQ feedback, explicit indication in the 2nd stage SCI is used. FFS details Working Assumption:
For HARQ feedback in groupcast and unicast, when PSFCH resource is (pre-)configured in the resource pool, SCI explicitly indicates whether HARQ feedback is used or not for the corresponding PSSCH transmission.

Working Assumption:
A single value of K is (pre-)configured in a resource pool.
K=3 is supported in addition to K=2.

Agreements:
For groupcast HARQ feedback, SCI explicitly indicates either Option 1 or Option 2 is to be used.

Agreements:
For implicit mechanism for PSFCH resource determination, Support FDM between PSFCH resources used for HARQ feedback of PSSCH transmissions with same starting sub-channel in different slots.

Agreements:
For implicit mechanism for PSFCH resource determination, In a resource pool, one or multiple PSFCH candidate resources are determined from the starting sub-channel index and slot index used for the corresponding PSSCH. Within the determined PSFCH candidate resources, PSFCH resource for actual transmission is selected based on at least the following parameters. For unicast and groupcast HARQ feedback Option 1, FFS: L1-source ID (i.e., the ID of TX UE) indicated by SCI. For groupcast HARQ feedback Option 2, member ID (i.e., the "identifier" agreed in RAN1 #97 to distinguish each RX UE in a group for Option 2 groupcast HARQ feedback). FFS: L1-source ID (i.e., the ID of TX UE) indicated by SCI.

Agreements:
For a PSFCH format, In the symbols that can be used for PSFCH transmissions in a resource pool, a set of frequency resources is (pre-)configured for the actual use of PSFCH transmissions (i.e., PSFCH transmissions do not happen in other frequency resources).

This (pre)configuration includes the case where all the frequency resources in a resource pool are available for the actual PSFCH transmission.

In this disclosure, we discuss aspects on physical layer procedure including SL HARQ procedure, CQI/RI measurement/reporting, and power control.

Power Control:

According to the agreement during the NR V2X SI, SL open-loop power control is supported, and the pathloss compensation between TX UE and gNB can be considered to mitigate interference to UL reception at gNB for broadcast, groupcast, and unicast. In addition, at least for unicast, pathloss compensation between TX UE and RX UE can be further considered to use TX power efficiently.

Regarding the scaling factor for the pathloss term (denoted by $\alpha\_PSCCH$, $\alpha\_PSSCH$), the value will be chosen based on the target coverage. Considering that the distance between gNB and UE will be much larger than the distance between UEs for sidelink, the suitable value of alpha will be different depending on the purpose of power control. To be specific, the alpha value for interference mitigation would be larger than the alpha value for SL power optimization.

Regarding the nominal power (denoted by $P\_(O\_PSCCH)$, $P\_(O\_PSSCH)$), when the value of alpha is 1 (full compensation), the value will be determined based on the target SINR. On the other hand, when the value of alpha is less than 1, the nominal power will be determined based on both target coverage and target SINR of cell edge UE. In this case, in a similar manner of alpha, it can be considered that the nominal power can be separately (pre)configured for DL pathloss and SL pathloss.

Proposal 1: Confirm the Following Working Assumption:

When the SL open-loop power control is configured to use both DL pathloss and SL pathloss, (Working assumption) PO and alpha values are separately (pre-)configured for DL pathloss and SL pathloss.

Regarding SL-RSRP measurement reporting, it is necessary to specify how TX UE calculates "Reference Signal Power" for SL PL derivation (=Reference Signal Power−L3 filtered SL RSRP received from RX UE). In our view, the same filter coefficient and normalization rule used for SL-RSRP measurement can be applied to transmit power of the RS for SL-RSRP measurement.

Proposal 2: For SL pathloss estimation, TX UE derives Reference Signal Power for pathloss estimation by using the same filter and normalization rule used for a L3-filtered SL-RSRP measurement.

Regarding power control for PSFCH, open-loop power control based on SL pathloss or SL-RSRP could be beneficial for groupcast HARQ feedback Option 2. To be specific, multiple RX UE will receive the PSSCH from the same TX UE. In this case, when the transmit power levels of multiple PSFCH transmission targeting the same UE are comparable, near-far problem could be efficiently alleviated even though multiple PSFCH transmissions are CDMed. However, in this case, SL-RSRP reporting needs to be supported for groupcast on top of the unicast. On the other hand, in case of unicast, TX UE-RX UE pair would be different in general across different PSFCH transmission in slot. Therefore, the received power of different PSFCH transmissions could be high regardless of whether power control based on SL pathloss or SL-RSRP is used or not for PSFCH transmission.

Observation 1: The benefit of power control based on SL pathloss or SL-RSRP for PSFCH transmission is unclear for unicast while the power control for PSFCH transmission would be beneficial for groupcast at the expense of signaling overhead for SL-RSRP reporting.

Proposal 3: Confirm the following working Assumption:

(working assumption) Sidelink pathloss based PSFCH power control is not supported.

For the power limited case in supporting simultaneous sidelink and uplink transmissions across different carriers, it is necessary to define priority rule between UL carrier and SL carrier. In NR, logical channel priority can be configured for UL channel(s) or SL channels. In this case, it would be natural to reuse it for priority rule for power control. For remaining UL or SL channels, it can be considered to follow LTE principle. To be specific, whether or not to allocate power for SL channel(s) is decided depending on priority indicated by SCI and higher layer parameter thresSL-Tx-Prioritizeation. In case of PSFCH, a UE could transmit more than one PSFCH in the same timing, it is necessary to define how to allocate each PSFCH power depending on the priority. For simplicity, it can be considered to decide whether sidelink transmissions are prioritized over uplink transmission according to the smallest priority value of sidelink transmissions, and then allocate power to the multiple PSFCH equally to ensure power of each PSFCH could be large enough considering EVM impairment and PSFCH coverage. When SL transmission is overlapped with LTE-UL transmission, it can be considered that power is allocated to LTE-UL transmission first to minimize impact on the LTE system.

Proposal 4: Power control for simultaneous transmission of sidelink and uplink across different carriers, If priority of uplink transmission is smaller than UL threshold, Uplink transmission is prioritized over sidelink transmission Else If priority of sidelink transmission is smaller than SL threshold, Sidelink transmission is prioritized over uplink transmission Else Uplink transmission is prioritized over sidelink transmission If more than one sidelink transmissions in a carrier is supported, the smallest priority value is used to compare with the threshold.

Note: UL threshold and SL threshold are high layer parameters.

Sidelink HARQ procedure

HARQ-ACK feedback resource

Considering physical structure of a sequence-based PSFCH format, it can be considered that PSFCH resource can be identified by a combination of cyclic shift value and (starting) RB index. In this case, it can be considered that PSFCH resource index is one-to-one mapped with a pair of cyclic shift value and RB index for simplicity of implicit mechanism of PSSCH-to-PSFCH resource as in PUCCH resource in LTE. In this case, for a given PSFCH resource set in frequency domain, as PSFCH resource index increases, code-domain index increases first, then RB index increases. For example, if the number of RB (group) for PSFCH resource set is M, and the number of cyclic shift is L, then PSFCH resource index will be given by $l+L*m$ where $l \in \{0, 1, \ldots, L-1\}$ is the cyclic shift index and $m \in \{0, 1, 彭, M-1\}$ is the starting RB index for the PSFCH resource. For efficient PSFCH resource management, it would be beneficial that the value of L, the number of cyclic shift per a PSFCH resource is constant in a resource pool.

Proposal 5: PSFCH resource is identified by a combination of code-domain parameter (e.g. m_0 value) and frequency domain parameter (e.g. RB index).

PSFCH resource indexing is in increasing order of first the order of m_0, and then the RB index over the assigned physical resources.

The number of PSFCH resources per PRB is the same for unicast, groupcast Option 1, and groupcast Option 2.

For a PSFCH format, a set of frequency resources is (pre-)configured for the actual use of PSFCH transmissions. In this case, the remaining issue is how to signaling the set of frequency resources. Considering forward compatibility, it would be better to have full flexibility to indicate which RB is used for the actual PSFCH transmissions, but the signaling overhead could be burden. Considering wideband transmission in the future release, part of RBs in each sub-channel could be reserved. On the other hand, considering guard band to avoid IBE, the set of frequency resources for the actual PSFCH transmissions could be restricted to a certain set of consecutive sub-channels.

Figure 17:
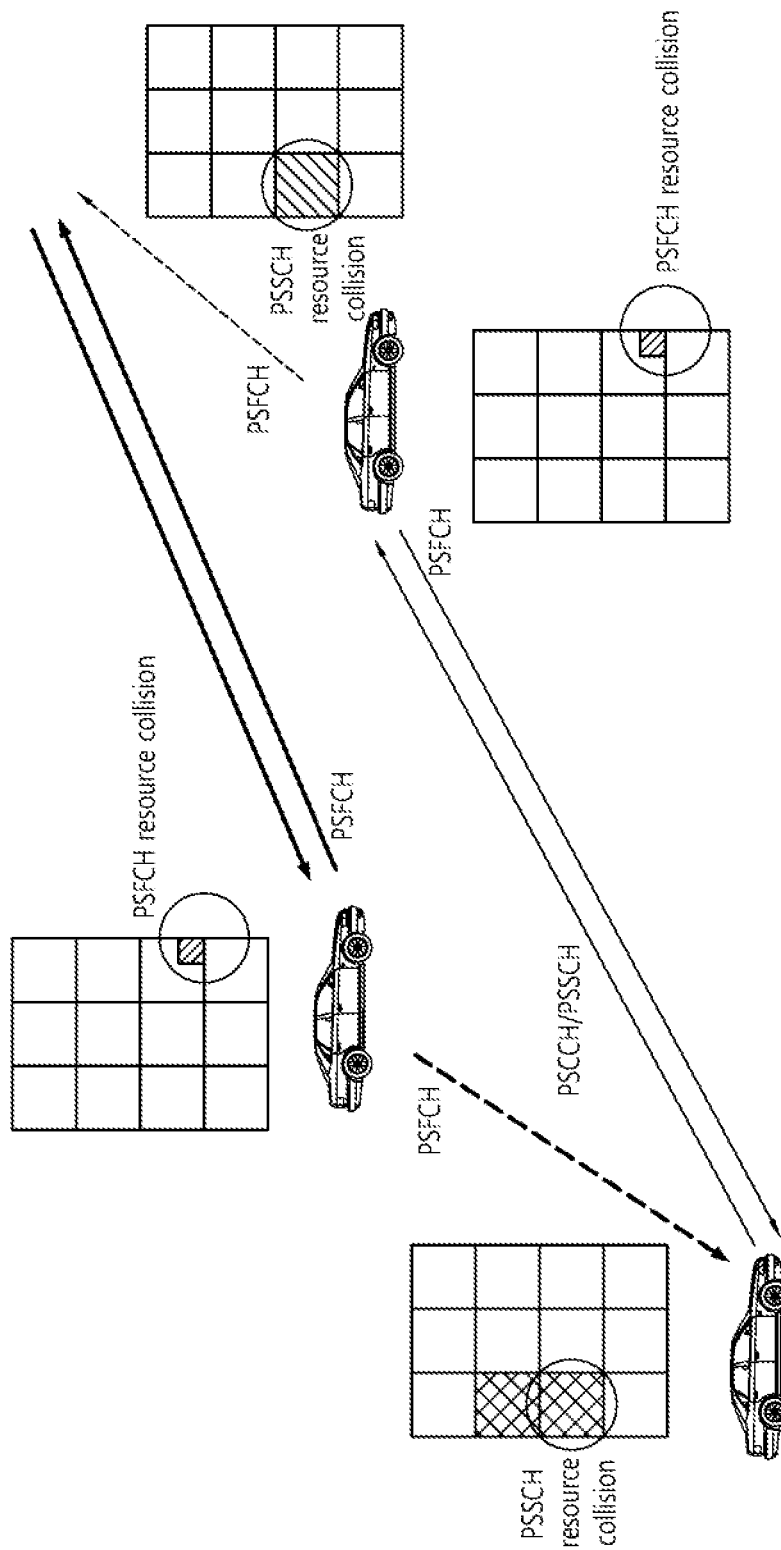
FIG. 17 shows an example of PSFCH resource collision.

FIG. 17 shows an example of PSFCH resource collision.

Proposal 6: For signaling RB set used for actual PSFCH transmission, down-select one of followings:
Option 1: Bitmap indicates RBs in a resource pool
Option 2: Bitmap indicates RBs in a sub-channel,
Option 2-1: The bitmap is applied to all the sub-channels in a resource pool
Option 2-2: The bitmap is applied to sub-channels indicated by another bitmap
Option 2-3: The bitmap is applied to sub-channels indicated by a combination of starting sub-channel index and the number of sub-channel
Option 3: Bitmap indicates sub-channels in a resource pool Next, in a resource pool, multiple PSCCH and PSSCH can be partially or fully overlapped in time-and-frequency resources considering Mode 2 operation. If these PSCCH and PSSCH are spatially multiplexed, it would be possible that RX UE distinguish them. If the received power of different PSCCH/PSSCH transmissions is sufficiently high, it is possible that RX UE successfully decode PSCCH/PSSCH with higher received power. In this case, if it is not supported to separate PSFCH resources between different PSSCH transmissions with the same starting sub-channel index of PSSCH in the same slot, PSFCH resource collision problem can occur as shown in FIG. 17. In other words, TX UE may receive multiple PSFCHs on the same resource from different RX UEs, or the TX UE may receive PSFCH from unintended RX UE. For instance, if the unintended RX UE is more close to the TX UE compared to the intended RX UE, the receive power of PSFCH from the unintended RX UE would be higher. In another example, if the intended RX UE fails to detect SCI, the TX UE may receive PSFCH from the unintended RX UE only. In those cases, the TX UE may make a wrong decision on the HARQ-ACK state. It will increase NACK-to-ACK error probability and ACK-to-NACK error probability, and it will cause unnecessary retransmission(s) or latency problem to resolve ACK-to-NACK error in higher layer.

Observation 2: It would be beneficial to separate PSFCH resources between different PSSCH transmissions with the same starting sub-channel in the same slot not to increase NACK-to-ACK error and ACK-to-NACK error probabilities.

Proposal 7: Within the determined PSFCH candidate resources, PSFCH resource for actual transmission is selected based on at least the following parameters For unicast and groupcast HARQ feedback Option 1, L1-source ID (i.e., the ID of TX UE) indicated by SCI.

For groupcast HARQ feedback Option 2, L1-source ID (i.e., the ID of TX UE) indicated by SCI in addition to member ID.

For implicit mechanism for PSFCH resource determination, several principles are agreed as follows:
Support FDM between PSFCH resources used for HARQ feedback of PSSCH transmissions with different starting sub-channel in the same slot
Support FDM between PSFCH resources used for HARQ feedback of PSSCH transmissions with different starting sub-channel(s) in different slots
Support FDM between PSFCH resources used for HARQ feedback of PSSCH transmissions with same starting sub-channel in different slots
For groupcast HARQ feedback Option 2, support CDM and FDM between PSFCH resources used by different RX UEs for HARQ feedback of the same PSSCH transmission
In a resource pool, one or multiple PSFCH candidate resources are determined from the starting sub-channel index and slot index used for the corresponding PSSCH
Within the determined PSFCH candidate resources, PSFCH resource for actual transmission is selected based on at least the following parameters
For unicast and groupcast HARQ feedback Option 1,
FFS: L1-source ID (i.e., the ID of TX UE) indicated by SCI
For groupcast HARQ feedback Option 2,
member ID (i.e., the "identifier" agreed in RAN1 #97 to distinguish each RX UE in a group for Option 2 groupcast HARQ feedback)
FFS: L1-source ID (i.e., the ID of TX UE) indicated by SCI FIG. 18 shows an example of PSSCH to PSFCH resource mapping.

Figure 18:
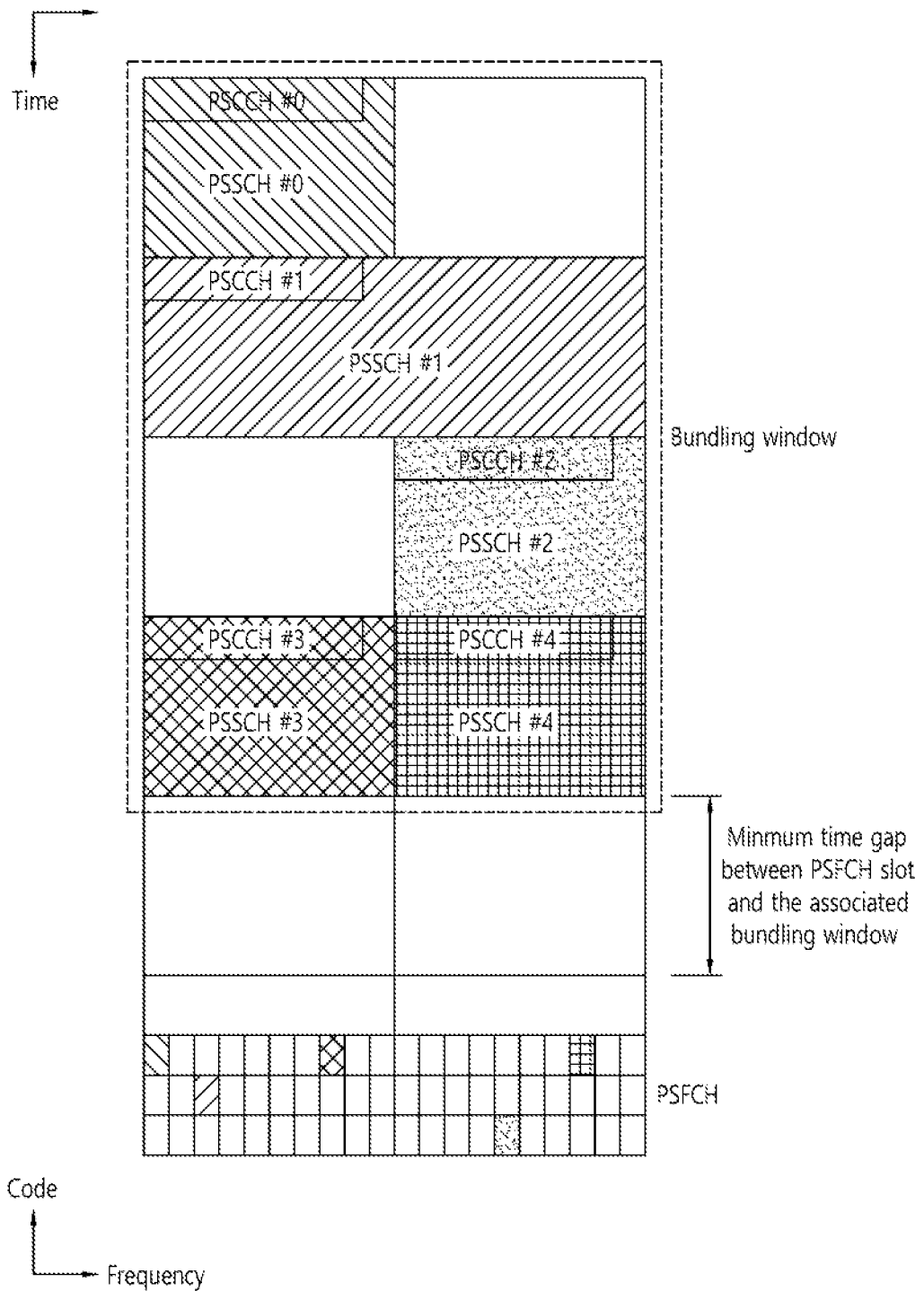
FIG. 18 shows an example of PSSCH to PSFCH resource mapping.

For instance, in FIG. 18, PSSCH #1 is partially overlapped with other PSSCH transmissions in frequency domain, but non-overlapped with other PSSCH transmissions in time domain. PSSCH #0, PSSCH #1, and PSSCH #3 have the same starting sub-channel, and then PSFCH resources for PSSCH #0, PSSCH #1, and PSSCH #3 can be FDMed in the same sub-channel based on the slot index of PSSCH. On the other hand, the starting sub-channel of PSSCH #1 is different from those of PSSCH #2 and PSSCH #4, but the allocated sub-channels are partially overlapped. In this case, PSFCH resource for PSSCH #1 and PSFCH resources for PSSCH #2 and PSSCH #4 will be mapped on different sub-channel. Meanwhile, PSFCH resource associated with the 2nd sub-channel of PSSCH #1 will not be used or used for other purposes (e.g. HARQ feedback for groupcast Option 2).

Figure 19:
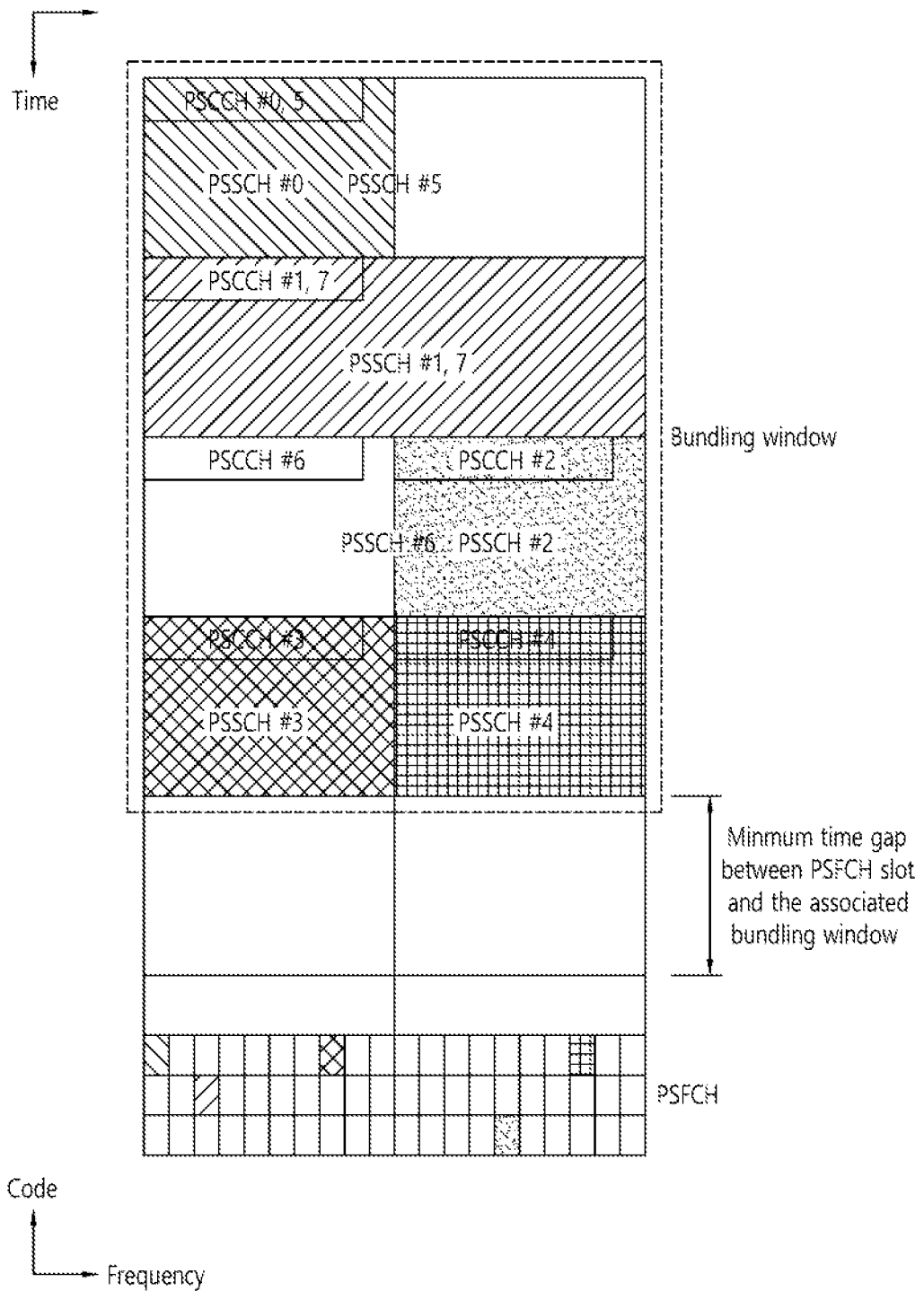
FIG. 19 shows other example of PSSCH to PSFCH resource mapping.

FIG. 19 shows other example of PSSCH to PSFCH resource mapping.

In addition to the above example, it can be considered that different PSSCH transmissions are partially or fully overlapped in time-and-frequency resources as shown in FIG. 19. First of all, since PSSCH resource collision can happen in any pair of a sub-channel and a slot, it is necessary that each pair of a sub-channel and a slot can be linked to multiple PSFCH resources. In FIG. 19, PSSCH #0 and PSSCH #5 will be overlapped in the starting sub-channel, and it is assumed that PSCCH #0 and PSCCH #5 is associated with different L1-source ID. In this case, for a given starting sub-channel of PSSCH and PSSCH slot, it can be considered that additional PSFCH resource offset can be applied depending on the L1-source ID indicated by the corresponding SCI. In this case, PSFCH resources for PSSCH #0 and PSSCH #5 can be FDMed in the same sub-channel. Next, starting sub-channel of PSSCH #2 is overlapped in the second sub-channel of PSSCH #6. When PSFCH resource is determined based on the starting sub-channel of PSSCH, PSFCH collisions can be simply avoided. Overlapping between PSSCH #1 and PSSCH #7 can be treated by additional PSFCH resource offset of which value is determined based on PSCCH DMRS sequence or other parameter to distinguish different PSSCH transmissions.

Figure 20:
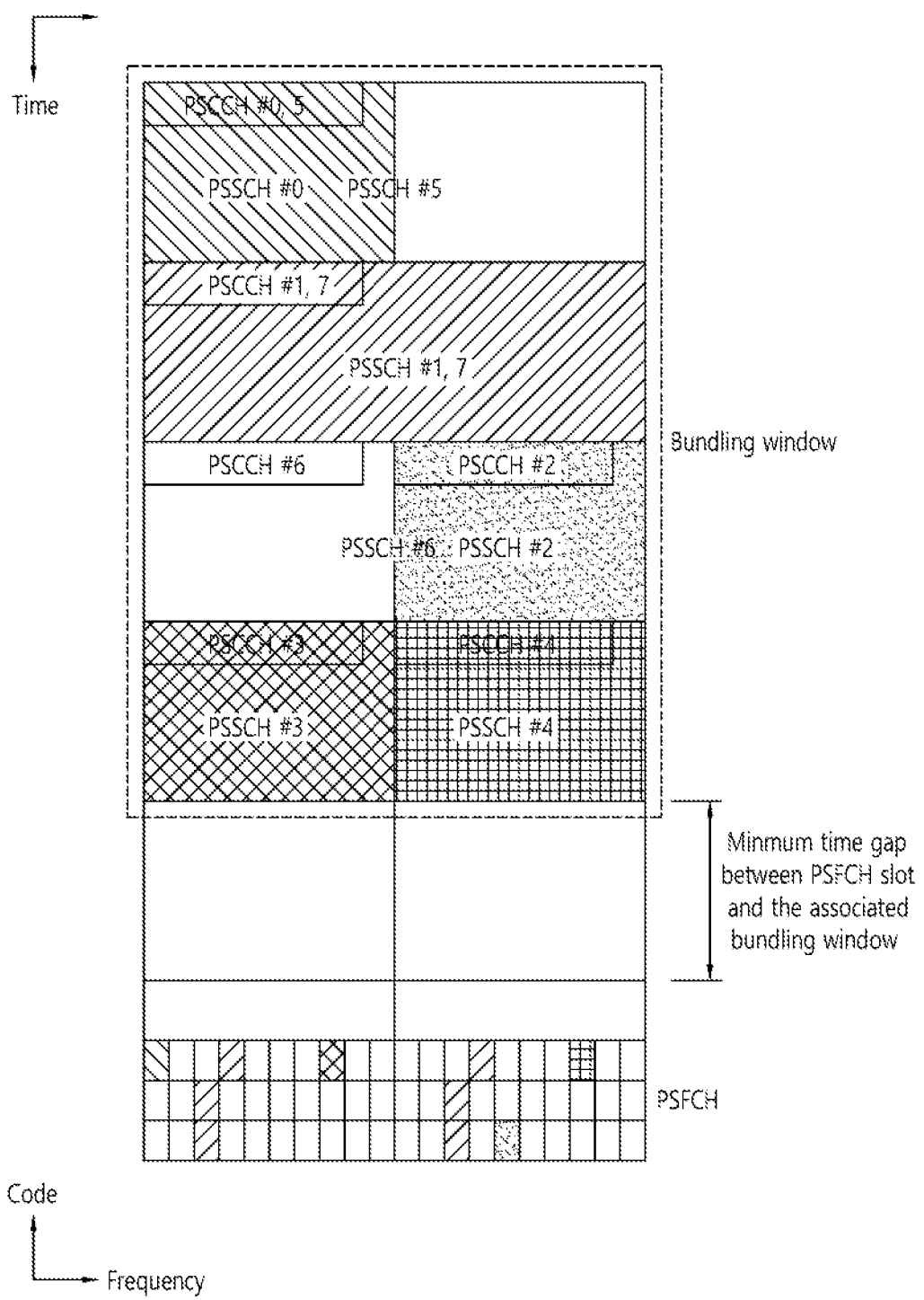
FIG. 20 shows another example of PSSCH to PSFCH resource mapping.

FIG. 20 shows another example of PSSCH to PSFCH resource mapping.

Another example is that PSFCH resource separation for HARQ feedback for groupcast Option 2. In FIG. 20, it is assumed that PSSCH #1 is groupcast and the number of RX UE in a group is 6. As mentioned earlier, any pair of a sub-channel or a slot can be used for groupcast. In addition, if PSFCH resource can be separated for the same time-and-frequency resources depending on the L1-source ID, groupcast also can use any DMRS sequence parameter for PSCCH. In those point of view, PSFCH resources for HARQ feedback for groupcast Option 2 can be the lowest level of the hierarchical structure. In this example, allocating PSFCH resources for Option 2 consider CDM from the given sub-channel, slot, and L1-source ID. When the number of PSFCH resources are not sufficient, it can be considered that PSFCH resources is allocated in sub-channel other than the starting sub-channel of the corresponding PSSCH. To avoid PSFCH resource collisions, the number of sub-channel for PSSCH can increases. In this example, PSSCH #1 with two sub-channels is used for groupcast, and PSFCH resources in the two sub-channels are used for multiple RX UE in a group. Alternatively, it can be considered that for groupcast Option 2, L1-source ID indicated by SCI would not be used for PSFCH resource determination. In other words, depending on the cast type and/or HARQ feedback option, mechanism to select PSFCH resource for the actual PSFCH transmission among PSFCH resources determined from the starting sub-channel index and slot index used for the corresponding PSSCH could be different.

Proposal 8: PSFCH resource is derived by following formula

PSFCH resource index=$I\_low \times S\_0 + n\_s \times S\_1 + n\_source \times S\_2 + (n\_member \bmod N\_member) \times S\_3 + n\_member/N\_member \times S\_0 + N\_offset \bmod N\_PRB \ N\_CS$ I_low is the starting sub-channel index of the corresponding PSSCH.

n_s is the slot order of the corresponding PSSCH within a bundling window.

The bundling window is defined as union of SL slots associated with the same slot where PSFCH resource is available.

n_source is L1-source ID mod X, where X is (pre) configured or predefined.

X can be different between groupcst Option 2 and others.

n_member is a member ID for groupcast Option 2. Otherwise, n_member=0.

N_member is (pre)configured to be either S_1/S_3 or S_2/S_3

N_PRB is the number of PRBs for the actual PSFCH transmissions in a resource pool N_CS is the number of m_0 values per PRB (Pre)configuration indicates S_0, S_1, S_2, S_3 and N_offset For the example on how to use the above formula, assume that the sub-channel size is 10 PRB, and the number of sub-channels in a resource pool is 3, and the PSFCH resource period N is 2. Next, for groupcast Option 2, the group size is 5. Next, for PSFCH resource set, the number of PRBs for the actual PSFCH transmission is 10 PRB, and the multiplexing capacity via CDM per PRB (i.e. the number of m_0) is 3. In this case, the total number of PSFCH resources in a slot is 30.

Figure 21:
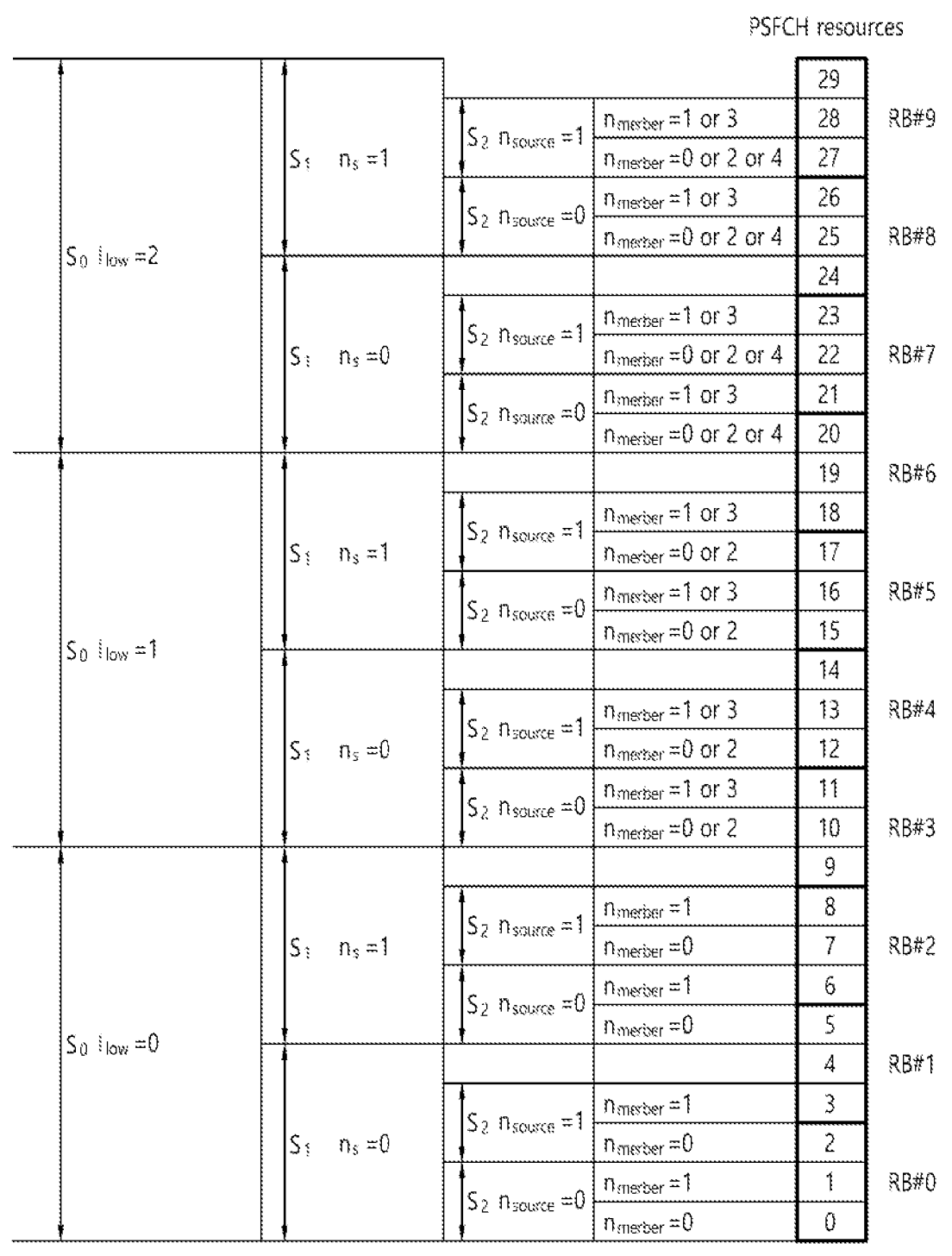

FIG. 21 shows an example of PSFCH resource determination based on formula.

For the PSFCH resource determination, assume that (pre) configuration sets S_0=10, S_1=5, S_2=2, S_3=1, and N_offset=0. Next, for the PSFCH resource collision handling, assume that the value of X is assumed to be 2 for all cast types and HARQ feedback options. Then, N_member=S_2/S_3=2. In this case, PSFCH resource determination could be summarized as shown in FIG. 21. In this case, if PSSCH for groupcast Option 2 is associated with sub-channel #1 and sub-channel #2 in the second slot within the bundling window, and if L1-source ID is odd number, TX UE will receive PSFCHs on PSFCH resource #17, #18, #27, and #28 from 4 RX UEs.

Figure 22:
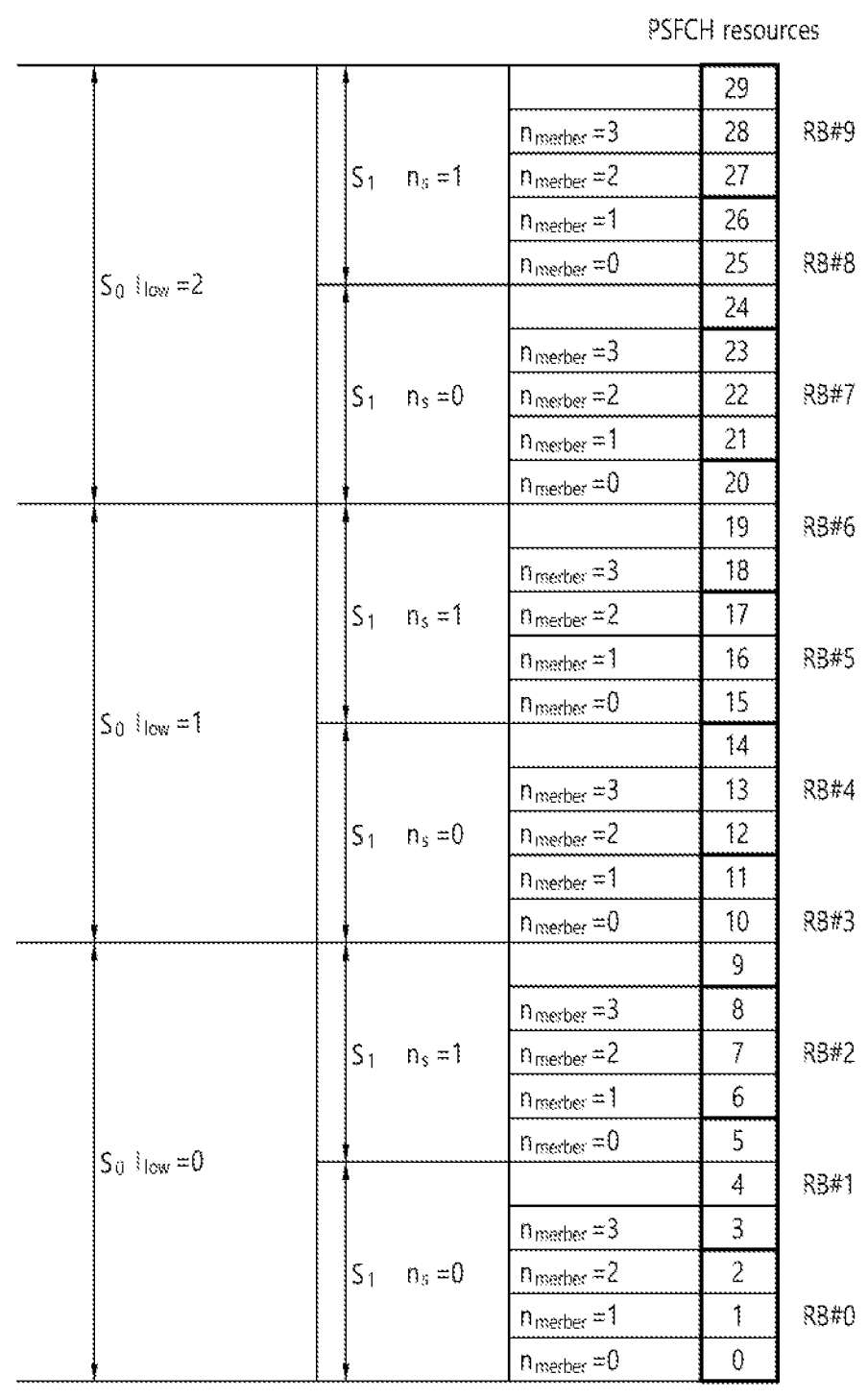

FIG. 22 shows other example of PSFCH resource determination based on formula.

In another example, it can be considered that PSFCH resource selection for groupcast Option 2 does not consider L1-source ID. In this case, the value of X is assumed to be 2 for unicast and groupcast Option 1, and X is 1 for groupcast Option 2. Then, N_member-S_1/S_3=5. In this case, PSFCH resource determination for groupcast Option 2 could be summarized as shown in FIG. 22.

Regarding PSFCH TX and/or RX collision issue, it is agreed that the L1 priority indicated by the associated SCI is used. Meanwhile, it is possible that priority of PSFCH transmission and priority of PSFCH reception are the same for Case 1, or multiple PSFCH transmissions have the same priority for Case 2. For tie-break, additional priority rule can be considered. For instance, HARQ state, and HARQ feedback payload size, certain UE behavior (PSFCH reception or PSFCH transmission) could be further considered. However, depending on the traffic characteristics or channel environment, suitable priority rule to select PSFCH transmission(s) or PSFCH receptions could be different. In this point of view, UE can decide how to handle the tie-break for the UE behavior on the PSFCH TX or RX.

Proposal 9: For Case 1 and Case 2, no additional priority rule is supported.

Regarding Case 3, rather than dropping some portion of HARQ feedback, it would be better to aggregate multiple HARQ feedback and to transmit them with a single PSFCH. Since the number of actual transmission of PSCCH/PSSCH within a HARQ bundling window will be varying in time-to-time, it is necessary to ensure that TX UE and RX UE have the same understanding on the SL HARQ feedback in terms of PSFCH resource and cyclic shift used for the actual transmission. In addition, it needs to consider the case where the RX UE fails to detect SCI. In our view, a sequence-based PSFCH format can convey up to two bits, therefore, 4 bits of HARQ-ACK feedback could be supported simultaneous transmission of two PSFCHs in a slot. The detailed description can be found in other parts of the present disclosure.

Proposal 10: For Case 3, support up to two PSFCH transmission(s) conveying 2 bits in a slot.

Meanwhile, TX UE can transmit PSSCH transmissions with different cast type and/or HARQ feedback Option to the RX UE across different slots within a bundling window.

Basically, when the RX UE fails to decode SCI, HARQ-ACK state of PSSCH transmitted in the slot will be treated as NACK/DTX or DTX since cast type and HARQ feedback option would not be known to the RX UE. To ensure ACK transmission, if at least one PSSCH associated with unicast or groupcast HARQ feedback Option 2 is detected within a bundling window, it can be considered that simply all the PSSCH transmissions within a bundling window are treated as unicast. On the other hand, if RX UE detect all the SCI within a bundling window, and if all the associated PSSCH transmissions are broadcast, then SL HARQ feedback on PSFCH may be skipped. In a similar manner, if RX UE successfully decode all the PSSCH transmissions associated with groupcast Option 1 within a bundling window, then SL HARQ feedback on PSFCH could be skipped.

If simultaneous transmissions of multiple PSFCHs is supported, it is necessary to define how to handle the combination(s) of Case 1, Case 2, and/or Case 3. To be specific, for a given slot, a UE may need to transmit more than one PSFCHs, and the UE may need to receive more than one PSFCHs in the same time. In addition, these PSFCH transmissions and receptions could have different priority. For simplicity, it can be considered that a UE decide first whether to perform PSFCH TX or PSFCH RX by comparing the smallest priority value of PSFCH TXs with the smallest priority value of PSFCH RXs. Then, if PSFCH TX is prioritized over PSFCH RX, the UE can transmit multiple PSFCHs if more than one PSFCH transmissions is supported.

Proposal 11: If more than one PSFCH transmissions is supported in Rel-16 NR sidelink, for handling combination of Case 1, Case 2, and Case 3, Decide first between PSFCH TX and PSFCH RX by comparing the smallest priority value of PSFCH TXs with the smallest priority value of PSFCH RXs.

If PSFCH TX is prioritized, UE can transmit more than one PSFCHs.

Otherwise, UE receives one or multiple PSFCHs.

Regarding CBG-based scheduling/HARQ feedback, it is necessary to investigate aspects on resource reservation for retransmission and HARQ codebook design and PSFCH structure. First of all, it is unclear how to perform retransmission reservation for CBG-based scheduling. To be specific, before UE receives CBG-based HARQ feedback, UE may not know how many CBG or which CBG needs to be retransmitted. Furthermore, the amount of resources for retransmission could be different depending on how many CBG will be retransmitted. In this case, when CBG-based scheduling is configured, it is necessary to define how the resource reservation can work. Next, in case of CBG-based HARQ feedback, the HARQ codebook size will be significantly increased compared to TB-based HARQ feedback. For instance, if the number of PSSCH slots associated with the same PSFCH is 4, and if the number of CBG for a TB is 4, then, the HARQ codebook size can be 16 bits. In this case, PSFCH format based PUCCH format 2 would be needed. However, PSFCH format based PUCCH format 2 would not be feasible due to the AGC settling time. Considering remaining time-budget, CBG-based retransmission and CBG-based HARQ feedback is not supported for Rel-16 NR sidelink.

Observation 3: To support CBG-based HARQ feedback for NR side link, it is necessary to investigate following aspects:

How to perform retransmission reservation

How to transmit large payload size of HARQ codebook on a sequence-based PSFCH format Proposal 12: CBG-based retransmission and HARQ feedback is not supported for Rel-16 NR sidelink.

Additional condition on disabling HARQ feedback

According to the agreement, when PSFCH resource is (pre-)configured in the resource pool, the actual transmission of HARQ feedback could be disabled by explicit SCI indication. In this case, TX UE will decide enabling or disabling HARQ feedback for the corresponding PSSCH transmission based on service type/requirement, and congestion level. For example, a certain service requiring stringent latency need to disable HARQ feedback and use blind retransmission to meet latency requirement. Furthermore, depending on the slot format, UE may not have chance to transmit HARQ feedback for a certain duration of time, and it can cause that UE does not meet the latency requirement. In addition, congestion level measured by each UE can affect SL HARQ feedback. This is because that when congestion level is high, HARQ feedback could be used to release retransmission resource depending on the HARQ-ACK state. On the other hand, when the congestion level is small, blind retransmission could be simply used.

Moreover, if the (pre)configured value of K is not sufficient for a certain condition due to the UE processing time, or if TX UE is not aware of its own location, it can be considered that the SCI can indicate disabling HARQ feedback for the corresponding PSSCH transmission.

Proposal 13: Confirm the Following Working Assumption:

For HARQ feedback in groupcast and unicast, when PSFCH resource is (pre-)configured in the resource pool, SCI explicitly indicates whether HARQ feedback is used or not for the corresponding PSSCH transmission.

TX-RX Distance Based HARQ Feedback

On the concept of Zone ID, geographical area can be divided into multiple zones, and each zone could be represented by Zone ID. Considering signaling overhead, different zones can have the same Zone ID. In this case, when the distance between different zones with the same Zone ID is too close, TX-RX distance-based HARQ feedback would not work properly. On the other hand, all the zones have the unique Zone ID, the signaling overhead would be a burden. Considering wrap-around issue and the signaling overhead, the bit field size of the Zone ID needs to be determined. For instance, when the distance between zones with the same Zone ID is large than SCI coverage, wrap-around issue would be mitigated. On the TX-RX distance calculation, it is necessary to define how the RX UE assumes the TX UE's location. For simplicity, it can be considered that the center of the nearest zone with the Zone ID indicated by the received SCI is TX UE's location for the TX-RX distance calculation.

Proposal 14: Confirm the following working Assumption: Working Assumption:

When the TX UE requested the RX UE for a TX-RX distance-based NACK ONLY HARQ FEEDBACK (via an indicator on SCI) but deriving/calculating the distance to the TX UE is not easy for the RX UE due to non-availability of the location of itself, the operations for the RX UE should be defined in the spec.

In an embodiment, regardless of the location information validity (or availability) of the RX UE, in order to satisfy the service requirements as much as possible, the RX UE in the above may transmit NACK information to the TX UE through PSFCH based on failure of decoding of the PSSCH.

For TX-RX distance-based HARQ feedback for groupcast Option 1, Zone is (pre-)configured with respect to geographical area, and Zone ID associated with TE UE's location is indicated by SCI.

Proposal 15: For TX-RX distance derivation, RX UE assumes that TX UE's location is the center of the nearest zone with the Zone ID indicated by the received SCI.

Meanwhile, TX UE may not know its own location. In this case, TX-RX distance-based HARQ feedback would not work properly. In this case, one possible way is that TX UE will disable HARQ-ACK feedback via explicit SCI indication for the corresponding PSSCH transmission. In this case, if Zone ID field is present in SCI, RX UE will skip it. Another way is that TX UE may not use the 2nd-stage SCI format including Zone-ID field in case when TX UE's location is not available. In this case, TX-RX distance-based HARQ feedback would be disabled. In those points of views, it would not be necessary that SCI can indicate the case where TX UE's location is not available. On the other hand, it is possible that the RX UE does not know its own location even though the TX UE's location is available at the RX UE side. In this case, RX UE cannot calculate distance between TX UE and RX UE as well. Similarly, it can be considered that the RX UE transmits HARQ feedback to the TX UE.

Proposal 16: Not support explicit SCI indication to indicate the case where TX UE's location is not available.

Proposal 17: If RX UE receives Zone ID via SCI, and if TX-RX distance is not available at RX UE side, then the RX UE assumes that the TX-RX distance is 0.

In an embodiment, a method for performing sidelink communication by a RX UE is provided. The method includes: receiving sidelink control information (SCI) from a TX UE, and transmitting hybrid automatic repeat request negative acknowledgement (HARQ NACK) to the TX UE through physical sidelink feedback channel (PSFCH) based on information on a location of the RX UE being not available and HARQ NACK-only feedback option being applied by the SCI, wherein a transport block (TB) related to the SCI is not decoded by the RX UE.

In an embodiment, the SCI may include zone identification (ID) of the TX UE.

In an embodiment, the zone ID may represent one of multiple zones mapped to geographical area.

In an embodiment, a location of the TX UE may be determined, by the RX UE, to central location of a nearest zone represented by the zone ID.

In an embodiment, a distance between the RX UE and the TX UE may be not available at the RX UE.

In an embodiment, a distance between the RX UE and the TX UE may be assumed to 0 by the RX UE.

In an embodiment, a distance between the RX UE and the TX UE may be assumed to 0 by the RX UE based on zone ID of the TX UE being included in the SCI and a distance between the RX UE and the TX UE being not available at the RX UE.

In an embodiment, the HARQ NACK may be transmitted to the TX UE based on zone ID of the TX UE being included in the SCI and a distance between the RX UE and the TX UE being not available at the RX UE.

In an embodiment, the HARQ NACK may be transmitted to the TX UE based on zone ID of the TX UE being included in the SCI and information on the location of the RX UE being not available.

In an embodiment, the RX UE may transmit the HARQ NACK to the RX UE based on availability of the location of the RX UE and a distance between the location of the RX UE and central location of a nearest zone represented by zone ID of the TX UE being smaller or equal to communication range requirement in the SCI.

In an embodiment, the HARQ NACK-only feedback option may represent that: the HARQ NACK may be transmitted to the TX UE based on the TB related to the SCI being not decoded by the RX UE, and HARQ feedback information including the HARQ NACK or HARQ acknowledgement (ACK) may not be transmitted to the TX UE based on the TB related to the SCI being decoded by RX UE.

Aspect on PSFCH detection

According to PUCCH performance, there are several requirements. First of all, probability of PUCCH DTX to ACK shall not exceed 1%. To be specific, when UE can fail to decode PDCCH, the UE does not transmit PUCCH for the PDSCH. However, gNB can try to detect PUCCH by using noise or interference, and it is possible that the noise or interference is detected as ACK. This kind of false alarm problem will make HARQ process inefficient, and it will cause latency problem since this error will be resolved in higher layer. Deepening on the implementation, PUCCH DTX could be checked after PUCCH detection mechanism is performed. For instance, for PUCCH format 0, if maximum correlation value between ACK or NACK sequence is less than a certain threshold, gNB can decide that PUCCH is not transmitted. Next, probability of NACK to ACK shall not exceed 0.1%. This error also can make HARQ process inefficient, and it will cause latency problem. Lastly, probability ACK missed detection shall not exceed 1%. This probability can include that case where PUCCH is not detected and the case where ACK is decided as NACK. This error will cause unnecessary retransmission.

For SL HARQ-ACK feedback on PSFCH, it can be considered that the performance requirement for PUCCH is a baseline for unicast and groupcast Option 2. On the other hand, in case of groupcast Option 1, since UE will not transmit PSFCH when the UE success to decode PSCCH/PSSCH for groupcast, the performance requirement may need to be modified. To be specific, first of all, since PSFCH DTX could be ACK, requirement for probability of PSFCH DTX to ACK may not be needed. Instead, probability of DTX to NACK would be needed. In a similar manner, PSFCH DTX decision could be made based on the correlation value for NACK sequence for groupcast Option 1. Next, instead of probability of NACK-to-ACK, probability of NACK missed detection may need to be considered. For instance, even though the RX UE transmit NACK on PSFCH to the TX UE, but the detected correlation value for the NACK sequence would not exceed a certain threshold at the TX UE side.

Considering QoS parameters and various service type in TS22.186, error requirement for SL HARQ-ACK feedback would need to be more tightened. For instance, when overall error requirement is $10^{\wedge}(-5)$, the error requirement for SL HARQ-ACK feedback also needs to be comparable with $10^{\wedge}(-5)$. Depending on the error requirement, it can be considered that the TX UE adjust thresholds to decide PSFCH DTX, ACK, or NACK to meet the requirement. For instance, the TX UE will decide whether ACK sequence is transmitted or NACK sequence is transmitted by comparing correlation values for ACK sequence and NACK sequence. Then, to enhance NACK to ACK detection probability, it can be considered to add a certain offset value to the correlation value for NACK sequence before the comparison. Next, the TX UE will decide whether the PSFCH is actually transmitted or not by comparing the correlation value for the selected sequence with the DTX threshold. Depending on the QoS parameter, the DTX threshold could be increased further. In this case, it would be beneficial to link between QoS parameters and the error requirement of SL HARQ-ACK feedback.

Proposal 18: Introduce error requirement for SL HARQ-ACK feedback as follows:

For unicast and groupcast Option 2
DTX to ACK probability
ACK missed detection probability
NACK to ACK detection probability
For groupcast Option 1
DTX to NACK probability
NACK missed detection probability Proposal 19: Support linkage between error requirement for SL HARQ-ACK feedback and QoS parameters.

CQI/RI Reporting

According to NR Uu link, rank and PMI reported to gNB could be restricted by higher layer signaling to manage interferences. In a similar manner, interference management would be beneficial in terms of detection performance of PSCCH/PSSCH and resource management including spatial reuse for NR sidelink. For instance, to reduce multi-layer interference, it can be considered that rank 2 transmission is not allowed in a certain resource pool. In this case, the RX UE does not need to report rank of 2 to the TX UE.

Proposal 20: Support rank restriction for PSSCH transmission and RI reporting.

Rank restriction information is (pre)configured or PC5-RRC configured.

Figure 23:
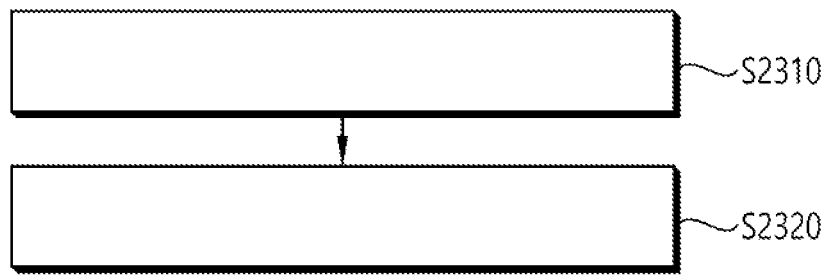
FIG. 23 is a flowchart illustrating the operation of a first apparatus in accordance with an embodiment of the present disclosure.

FIG. 23 is a flowchart illustrating the operation of a first apparatus in accordance with an embodiment of the present disclosure.

Operations disclosed in the flowchart of FIG. 23 may be performed in combination with various embodiments of the present disclosure. In one example, the operations disclosed in the flowchart of FIG. 23 may be performed based on at least one of the devices illustrated in FIG. 25 through FIG. 30.

In one example, the first apparatus and/or a second apparatus of FIG. 23 may correspond to a first wireless device 100 of FIG. 26 described below. In another example, the first apparatus and/or the second apparatus of FIG. 23 may correspond to a second wireless device 200 of FIG. 26 described below.

In step S2310, the first apparatus according to an embodiment may receive sidelink control information (SCI) from a second apparatus.

In step S2320, the first apparatus according to an embodiment may transmit hybrid automatic repeat request negative acknowledgement (HARQ NACK) to the second apparatus through physical sidelink feedback channel (PSFCH) based on information on a location of the first apparatus being not available and HARQ NACK-only feedback option being applied by the SCI.

In an embodiment, a transport block (TB) related to the SCI may be not decoded by the first apparatus.

In an embodiment, the SCI may include zone identification (ID) of the second apparatus.

In an embodiment, the zone ID may represent one of multiple zones mapped to geographical area.

In an embodiment, a location of the second apparatus may be determined, by the first apparatus, to central location of a nearest zone represented by the zone ID.

In an embodiment, a distance between the first apparatus and the second apparatus may be not available at the first apparatus.

In an embodiment, a distance between the first apparatus and the second apparatus may be assumed to 0 by the first apparatus.

In an embodiment, a distance between the first apparatus and the second apparatus may be assumed to 0 by the first apparatus based on zone ID of the second apparatus being included in the SCI and a distance between the first apparatus and the second apparatus being not available at the first apparatus.

In an embodiment, the HARQ NACK may be transmitted to the second apparatus based on zone ID of the second apparatus being included in the SCI and a distance between the first apparatus and the second apparatus being not available at the first apparatus.

In an embodiment, the HARQ NACK may be transmitted to the second apparatus based on zone ID of the second apparatus being included in the SCI and information on the location of the first apparatus being not available.

In an embodiment, the first apparatus may transmit the HARQ NACK to the second apparatus based on knowing the location of the first apparatus and a distance between the location of the first apparatus and central location of a nearest zone represented by zone ID of the second apparatus being smaller or equal to communication range requirement in the SCI.

In an embodiment, the HARQ NACK-only feedback option may represent that: the HARQ NACK is transmitted to the second apparatus based on the TB related to the SCI being not decoded by the first apparatus, and HARQ feedback information including the HARQ NACK or HARQ acknowledgement (ACK) is not transmitted to the second apparatus based on the TB related to the SCI being decoded by the first apparatus.

According to an embodiment of the present disclosure, a first apparatus for performing sidelink communication is provided. The first apparatus may include at least one memory to store instructions, at least one transceiver, and at least one processor to connect the at least one memory and the at least one transceiver, wherein the at least one processor may control the at least one transceiver to receive SCI from a second apparatus, and control the at least one transceiver to transmit HARQ NACK to the second apparatus through PSFCH based on information on a location of the first apparatus being not available and HARQ NACK-only feedback option being applied by the SCI Wherein a TB related to the SCI is not decoded by the first apparatus.

According to an embodiment of the present disclosure, an apparatus (or chip) configured to control a first terminal is provided. The apparatus may include at least one processor and at least one computer memory that is connected to be executable by the at least one processor and stores instructions, wherein the at least one processor executes the instructions to cause the first terminal to: receive SCI from a second terminal, and transmit HARQ NACK to the second terminal through PSFCH based on information on a location of the first terminal being not available and HARQ NACK-only feedback option being applied by the SCI, wherein a TB related to the SCI is not decoded by the first terminal.

In one example, the first terminal of the embodiment may indicate the first apparatus described throughout the present disclosure. In one example, each of the at least one processor, the at least one memory, and the like in the apparatus for controlling the first terminal may be configured as a separate sub-chip, or at least two components thereof may be configured through a single sub-chip.

According to an embodiment of the present disclosure, a non-transitory computer-readable storage medium that stores instructions (or indications) is provided. When the instructions are executed, the instructions cause a first apparatus to: receive SCI from a second apparatus, and transmit HARQ NACK to the second apparatus through PSFCH based on information on a location of the first apparatus being not available and HARQ NACK-only feedback option being applied by the SCI, wherein a TB related to the SCI is not decoded by the first apparatus.

According to an embodiment of the present disclosure, a method for performing sidelink communication by a third apparatus is provided. The method including: transmitting physical sidelink control channel (PSCCH) or physical sidelink shared channel (PSSCH) to a fourth apparatus, transmitting physical uplink control channel (PUCCH) or physical uplink shared channel (PUSCH) to a base station and transmitting hybrid automatic repeat request negative acknowledgement (HARQ NACK) to the base station based on physical sidelink feedback channel (PSFCH) being not received from the fourth apparatus, wherein a first time resource for transmitting the PUCCH or the PUSCH and a second time resource for receiving the PSFCH are overlap with each other, and wherein the PSFCH is not received from the fourth apparatus based on a priority value related to the reception of the PSFCH being larger than a priority value related to the transmission of the PUCCH or the PUSCH.

Figure 24:
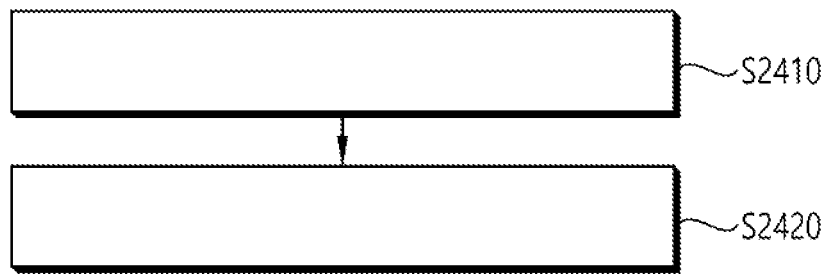
FIG. 24 is a flowchart illustrating the operation of a second apparatus in accordance with an embodiment of the present disclosure.

FIG. 24 is a flowchart illustrating the operation of a second apparatus in accordance with an embodiment of the present disclosure.

Operations disclosed in the flowchart of FIG. 24 may be performed in combination with various embodiments of the present disclosure. In one example, the operations disclosed in the flowchart of FIG. 24 may be performed based on at least one of the devices illustrated in FIG. 25 through FIG. 30.

In one example, the first apparatus and/or a second apparatus of FIG. 24 may correspond to a second wireless device 200 of FIG. 26 described below. In another example, the first apparatus and/or the second apparatus of FIG. 24 may correspond to a first wireless device 100 of FIG. 26 described below.

In step S2410, the second apparatus according to an embodiment may transmit SCI to a first apparatus.

In step S2420, the second apparatus according to an embodiment may receive HARQ NACK from the first apparatus through PSFCH based on information on a location of the first apparatus being not available in the first apparatus and HARQ NACK-only feedback option being applied to the first apparatus by the SCI.

In an embodiment, a TB related to the SCI may be not decoded by the first apparatus.

In an embodiment, the SCI may include zone identification (ID) of the second apparatus.

In an embodiment, the zone ID may represent one of multiple zones mapped to geographical area.

In an embodiment, a location of the second apparatus may be determined, by the first apparatus, to central location of a nearest zone represented by the zone ID.

In an embodiment, a distance between the first apparatus and the second apparatus may be not available at the first apparatus.

In an embodiment, a distance between the first apparatus and the second apparatus may be assumed to 0 by the first apparatus.

In an embodiment, a distance between the first apparatus and the second apparatus may be assumed to 0 by the first apparatus based on zone ID of the second apparatus being included in the SCI and a distance between the first apparatus and the second apparatus being not available at the first apparatus.

In an embodiment, the HARQ NACK may be transmitted to the second apparatus based on zone ID of the second apparatus being included in the SCI and a distance between the first apparatus and the second apparatus being not available at the first apparatus.

In an embodiment, the HARQ NACK may be transmitted to the second apparatus based on zone ID of the second apparatus being included in the SCI and information on the location of the first apparatus being not available.

In an embodiment, the first apparatus may transmit the HARQ NACK to the second apparatus based on knowing the location of the first apparatus and a distance between the location of the first apparatus and central location of a nearest zone represented by zone ID of the second apparatus being smaller or equal to communication range requirement in the SCI.

In an embodiment, the HARQ NACK-only feedback option may represent that: the HARQ NACK is transmitted to the second apparatus based on the TB related to the SCI being not decoded by the first apparatus, and HARQ feedback information including the HARQ NACK or HARQ acknowledgement (ACK) is not transmitted to the second apparatus based on the TB related to the SCI being decoded by the first apparatus.

According to an embodiment of the present disclosure, a second apparatus for performing sidelink communication is provided. The second apparatus may include at least one memory storing instructions, at least one transceiver and at least one processor connected to the at least one memory and the at least one transceiver, wherein the at least one processor is configured to: control the at least one transceiver to transmit SCI to a first apparatus, and control the at least one transceiver to receive HARQ NACK from the first apparatus through PSFCH based on information on a location of the first apparatus being not available in the first apparatus and HARQ NACK-only feedback option being applied to the first apparatus by the SCI, wherein a TB related to the SCI is not decoded by the first apparatus.

According to an embodiment of the present disclosure, a method for performing sidelink communication by a third apparatus is provided. The method including: transmitting physical sidelink control channel (PSCCH) or physical sidelink shared channel (PSSCH) to a fourth apparatus, transmitting physical uplink control channel (PUCCH) or physical uplink shared channel (PUSCH) to a base station and transmitting hybrid automatic repeat request negative acknowledgement (HARQ NACK) to the base station based on physical sidelink feedback channel (PSFCH) being not received from the fourth apparatus, wherein a first time resource for transmitting the PUCCH or the PUSCH and a second time resource for receiving the PSFCH are overlap with each other, and wherein the PSFCH is not received from the fourth apparatus based on a priority value related to the reception of the PSFCH being larger than a priority value related to the transmission of the PUCCH or the PUSCH.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
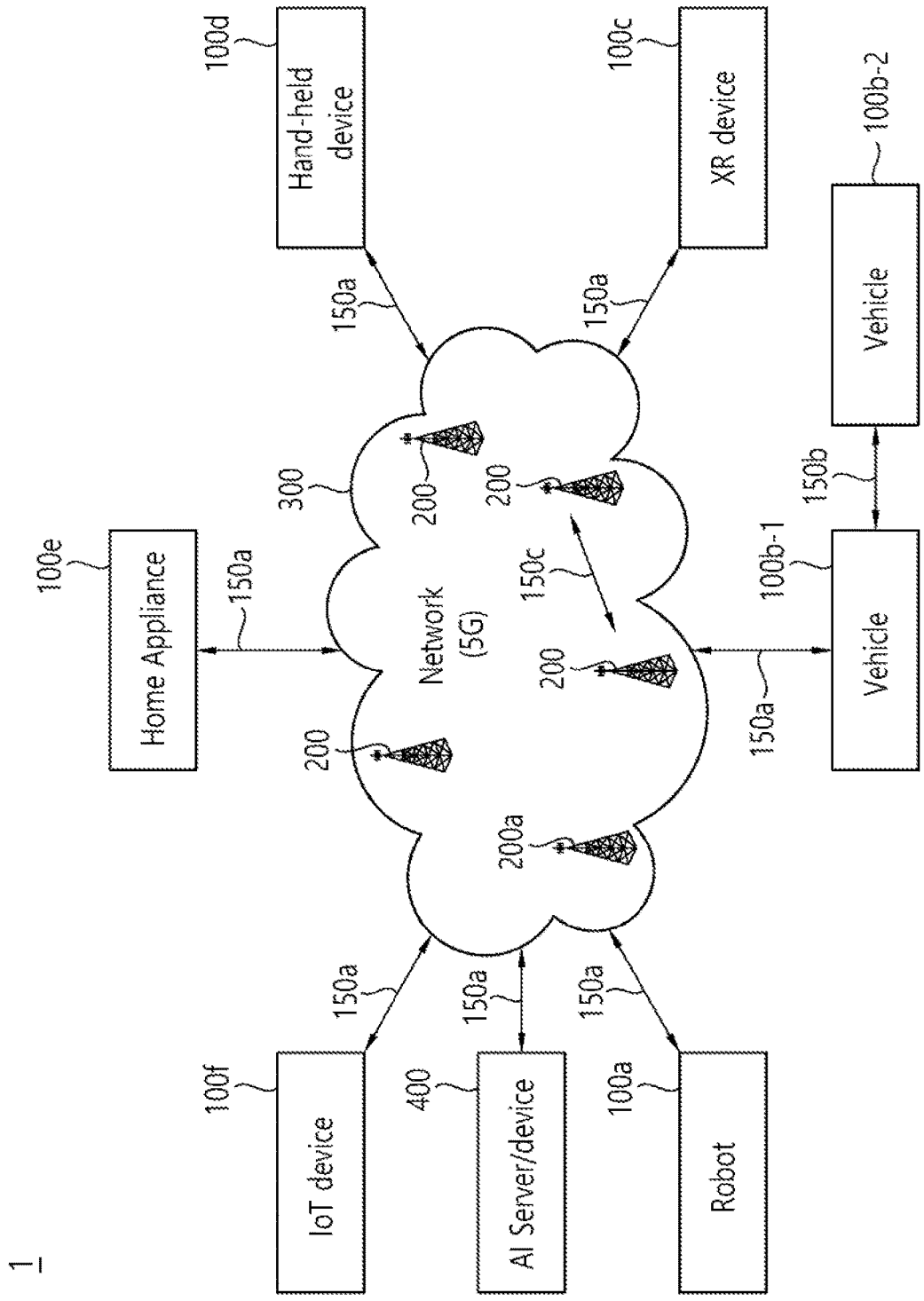
FIG. 25 shows a communication system in accordance with an embodiment of the present disclosure.

FIG. 25 shows a communication system 1 in accordance with an embodiment of the present disclosure.

Referring to FIG. 25, a communication system 1 to which various embodiments of the present disclosure are applied includes wireless devices, Base Stations (BSs), and a network. Herein, the wireless devices represent devices performing communication using radio access technology (RAT) (e.g., 5G new rat (NR)) or long-term evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an unmanned aerial vehicle (UAV) (e.g., a drone). The XR device may include an augmented reality (AR)/virtual reality (VR)/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, or the like The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
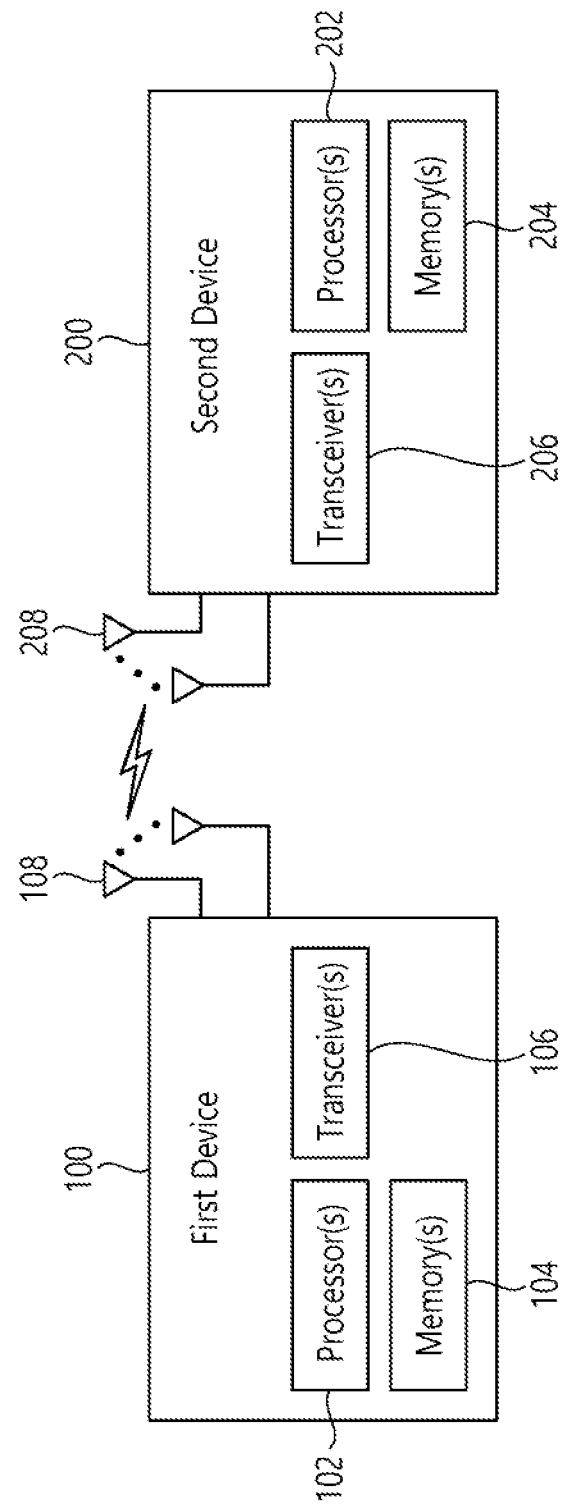
FIG. 26 shows wireless devices in accordance with an embodiment of the present disclosure.

FIG. 26 shows wireless devices in accordance with an embodiment of the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application-specific integrated Circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels or the like from RF band signals into baseband signals in order to process received user data, control information, radio signals/channels, or the like using the one or more processors 102 and 202. The one or more transceivers 106 and 206 may convert the user data, control information, radio signals/channels, or the like processed using the one or more processors 102 and 202 from the base band signals into the RF band signals. To this end, the one or more transceivers 106 and 206 may include (analog) oscillators and/or filters.

Figure 27:
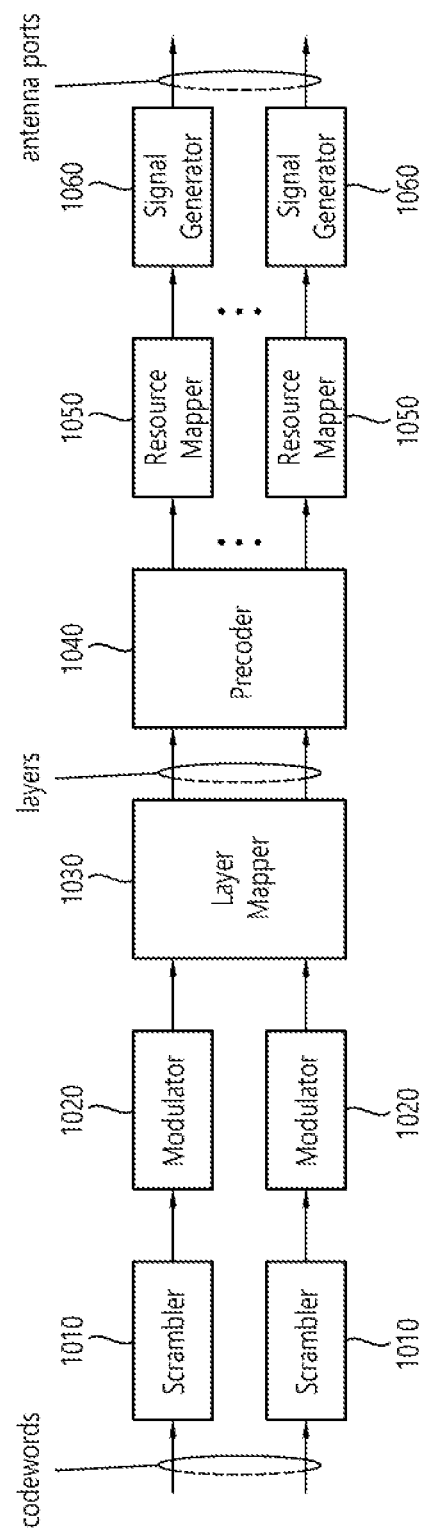
FIG. 27 shows a signal process circuit for a transmission signal in accordance with an embodiment of the present disclosure.

FIG. 27 shows a signal process circuit for a transmission signal in accordance with an embodiment of the present disclosure.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed by, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include inverse fast Fourier transform (IFFT) modules, cyclic prefix (CP) inserters, digital-to-analog converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
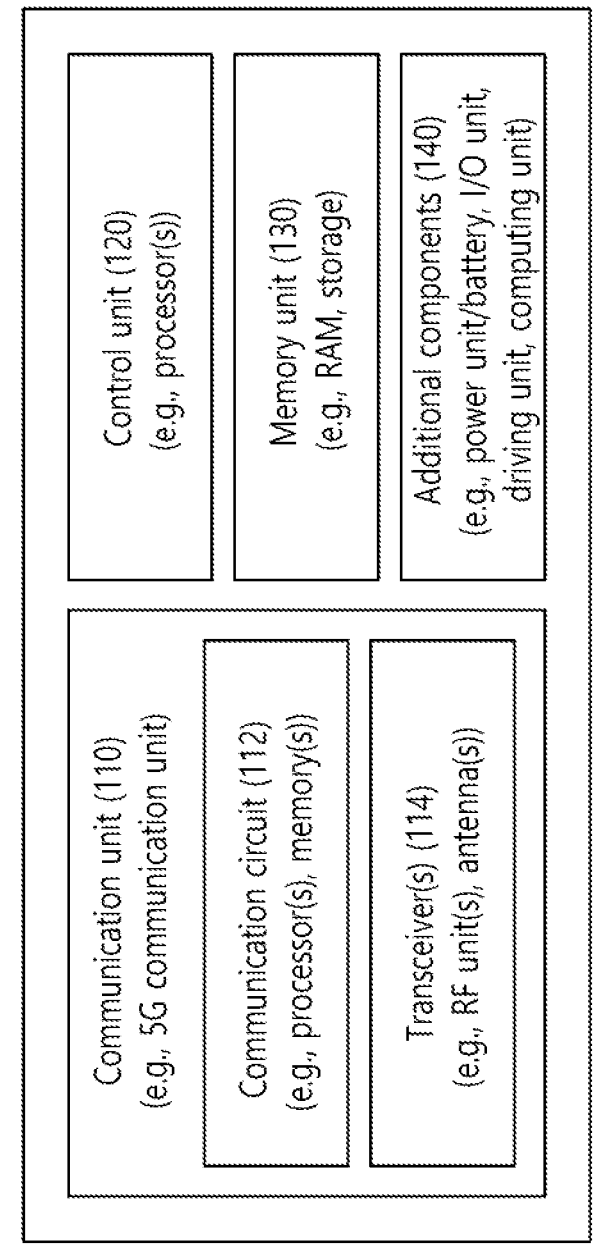
FIG. 28 shows a wireless device in accordance with an embodiment of the present disclosure.

FIG. 28 shows a wireless device in accordance with an embodiment of the present disclosure. The wireless device may be implemented in various forms according to a use-case/service (see FIG. 25).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, or the like The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Hereinafter, an example of implementing FIG. 28 will be described in detail with reference to the drawings.

Figure 29:
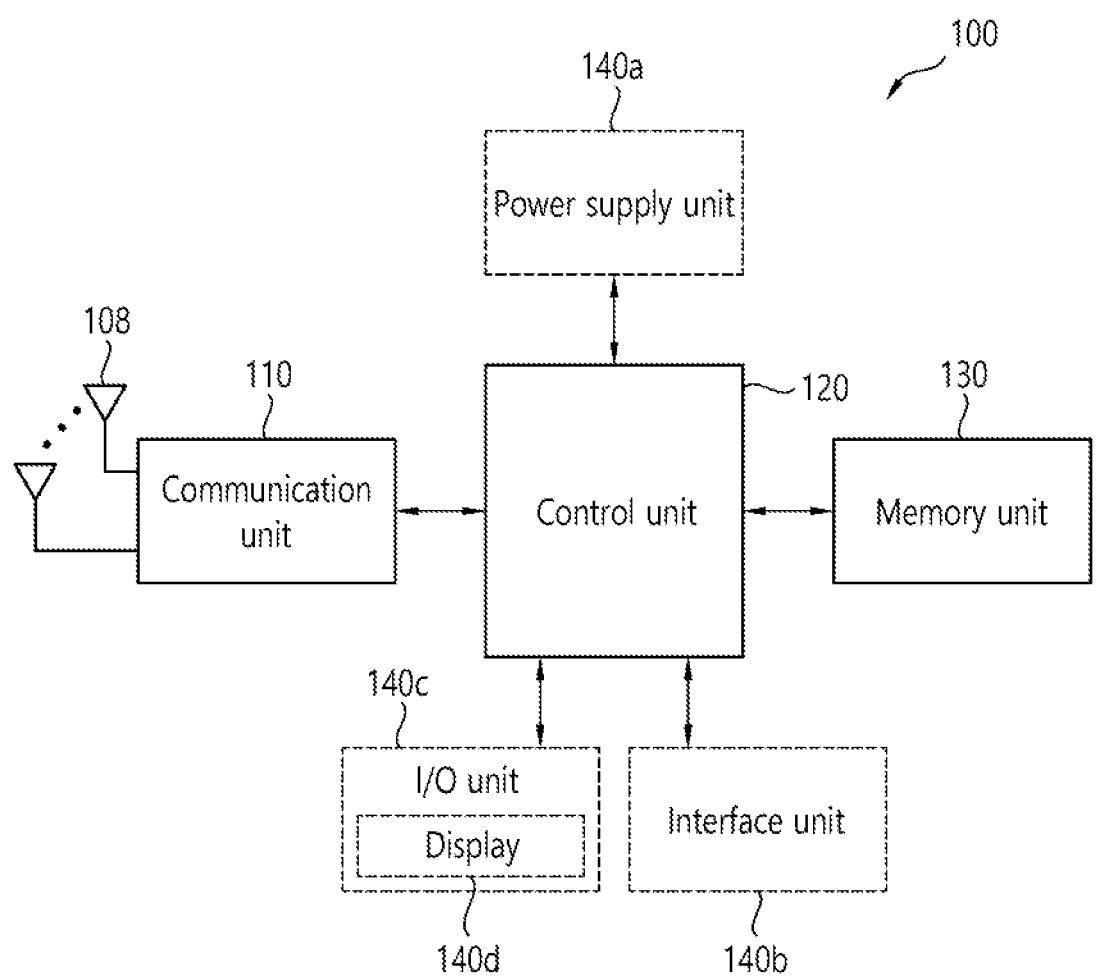
FIG. 29 shows a hand-held device in accordance with an embodiment of the present disclosure.

FIG. 29 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, or the like. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
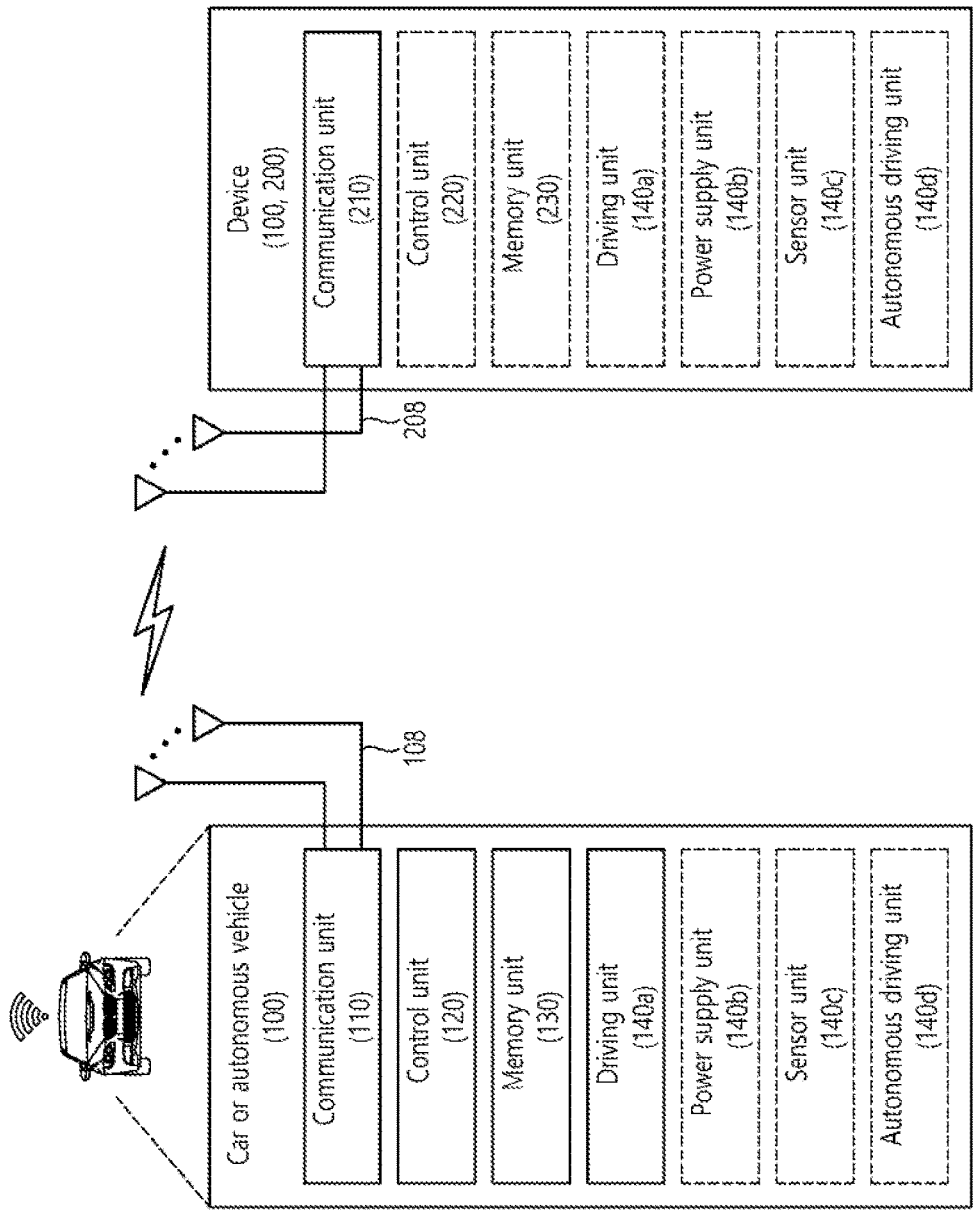
FIG. 30 shows a car or an autonomous vehicle in accordance with an embodiment of the present disclosure.

FIG. 30 shows a car or an autonomous vehicle in accordance with an embodiment of the present disclosure. The car or autonomous vehicle may be implemented by a mobile robot, a car, a train, a manned/unmanned aerial vehicle (AV), a ship, or the like Referring to FIG. 30, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140a may cause the vehicle or the autonomous vehicle 100 to drive on a road. The driving unit 140a may include an engine, a motor, a powertrain, a wheel, a brake, a steering device, or the like The power supply unit 140b may supply power to the vehicle or the autonomous vehicle 100 and include a wired/wireless charging circuit, a battery, or the like The sensor unit 140c may acquire a vehicle state, ambient environment information, user information, or the like The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, or the like The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, or the like from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, or the like, based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink communication by a first apparatus, the method comprising:
   receiving first sidelink control information (SCI) for scheduling of a physical sidelink shared channel (PSSCH) and second SCI, from a second apparatus through a physical sidelink control channel (PSCCH);
   receiving the second SCI including a zone identity (ID), and data, from the second apparatus through the PSSCH; and
   transmitting a negative acknowledgement, to the second apparatus through a physical sidelink feedback channel (PSFCH), based on (i) negative-only acknowledgement being represented by the second SCI (ii) location information of the first apparatus not being available and (iii) the data not being successfully decoded.

2. The method of claim 1, wherein the zone ID represents one of multiple zones mapped to a geographical area.

3. The method of claim 1, wherein a location of the second apparatus is determined, by the first apparatus, to be a central location of a nearest zone represented by the zone ID.

4. The method of claim 1, wherein a distance between the first apparatus and the second apparatus is not available at the first apparatus.

5. The method of claim 1, wherein a distance between the first apparatus and the second apparatus is assumed to be zero by the first apparatus.

6. The method of claim 1, wherein a distance between the first apparatus and the second apparatus is assumed to be zero by the first apparatus based on the zone ID of the second apparatus being included in the second SCI and a distance between the first apparatus and the second apparatus not being available at the first apparatus.

7. The method of claim 1, wherein the negative acknowledgement is transmitted to the second apparatus based on the zone ID of the second apparatus being included in the second SCI and a distance between the first apparatus and the second apparatus not being available at the first apparatus.

8. The method of claim 1, wherein the negative acknowledgement is transmitted to the second apparatus based on the zone ID of the second apparatus being included in the second SCI and the location information of the first apparatus not being available.

9. A first apparatus adapted to perform sidelink communication, the first apparatus comprising:
   at least one transceiver;
   at least one processor; and
   at least one memory connected to the at least one processor and storing instructions that, based on being executed, cause the first apparatus to perform operations comprising:
   receiving first sidelink control information (SCI) for scheduling of a physical sidelink shared channel (PSSCH) and second SCI, from a second apparatus through a physical sidelink control channel (PSCCH);
   receiving the second SCI including a zone identity (ID), and data, from the second apparatus through the PSSCH; and
   transmitting a negative acknowledgement, to the second apparatus through a physical sidelink feedback channel (PSFCH), based on (i) negative-only acknowledgement being represented by the second SCI (ii) location information of the first apparatus not being available and (iii) the data not being successfully decoded.

10. A processing device adapted to control a first apparatus, the processing device comprising:
    at least one processor; and
    at least one memory connected to the at least one processor and storing instructions that, based on being executed, cause the first apparatus to perform operations comprising:
    receiving first sidelink control information (SCI) for scheduling of a physical sidelink shared channel (PSSCH) and second SCI, from a second apparatus through a physical sidelink control channel (PSCCH);
    receiving the second SCI including a zone identity (ID), and data, from the second apparatus through the PSSCH; and
    transmitting a negative acknowledgement, to the second apparatus through a physical sidelink feedback channel (PSFCH), based on (i) negative-only acknowledgement being represented by the second SCI (ii) location information of the first apparatus not being available and (iii) the data not being successfully decoded.

11. The first apparatus of claim 9, wherein the zone ID represents one of multiple zones mapped to a geographical area.

12. The first apparatus of claim 9, wherein a location of the second apparatus is determined, by the first apparatus, to be a central location of a nearest zone represented by the zone ID.

13. The first apparatus of claim 9, wherein a distance between the first apparatus and the second apparatus is not available at the first apparatus.

14. The first apparatus of claim 9, wherein a distance between the first apparatus and the second apparatus is assumed to be zero by the first apparatus.

15. The first apparatus of claim 9, wherein a distance between the first apparatus and the second apparatus is assumed to be zero by the first apparatus based on the zone ID of the second apparatus being included in the second SCI and a distance between the first apparatus and the second apparatus not being available at the first apparatus.

16. The processing device of claim 10, wherein the zone ID represents one of multiple zones mapped to a geographical area.

17. The processing device of claim 10, wherein a location of the second apparatus is determined, by the first apparatus, to be a central location of a nearest zone represented by the zone ID.

18. The processing device of claim 10, wherein a distance between the first apparatus and the second apparatus is not available at the first apparatus.

19. The processing device of claim 10, wherein a distance between the first apparatus and the second apparatus is assumed to be zero by the first apparatus.

20. The processing device of claim 10, wherein a distance between the first apparatus and the second apparatus is assumed to be zero by the first apparatus based on the zone ID of the second apparatus being included in the second SCI and a distance between the first apparatus and the second apparatus not being available at the first apparatus.

\* \* \* \* \*